June 27, 1961
A. W. VIBBER
2,989,837
TWISTING SPINDLE BALLOON CONTROL
Filed Jan. 22, 1960
7 Sheets-Sheet 6
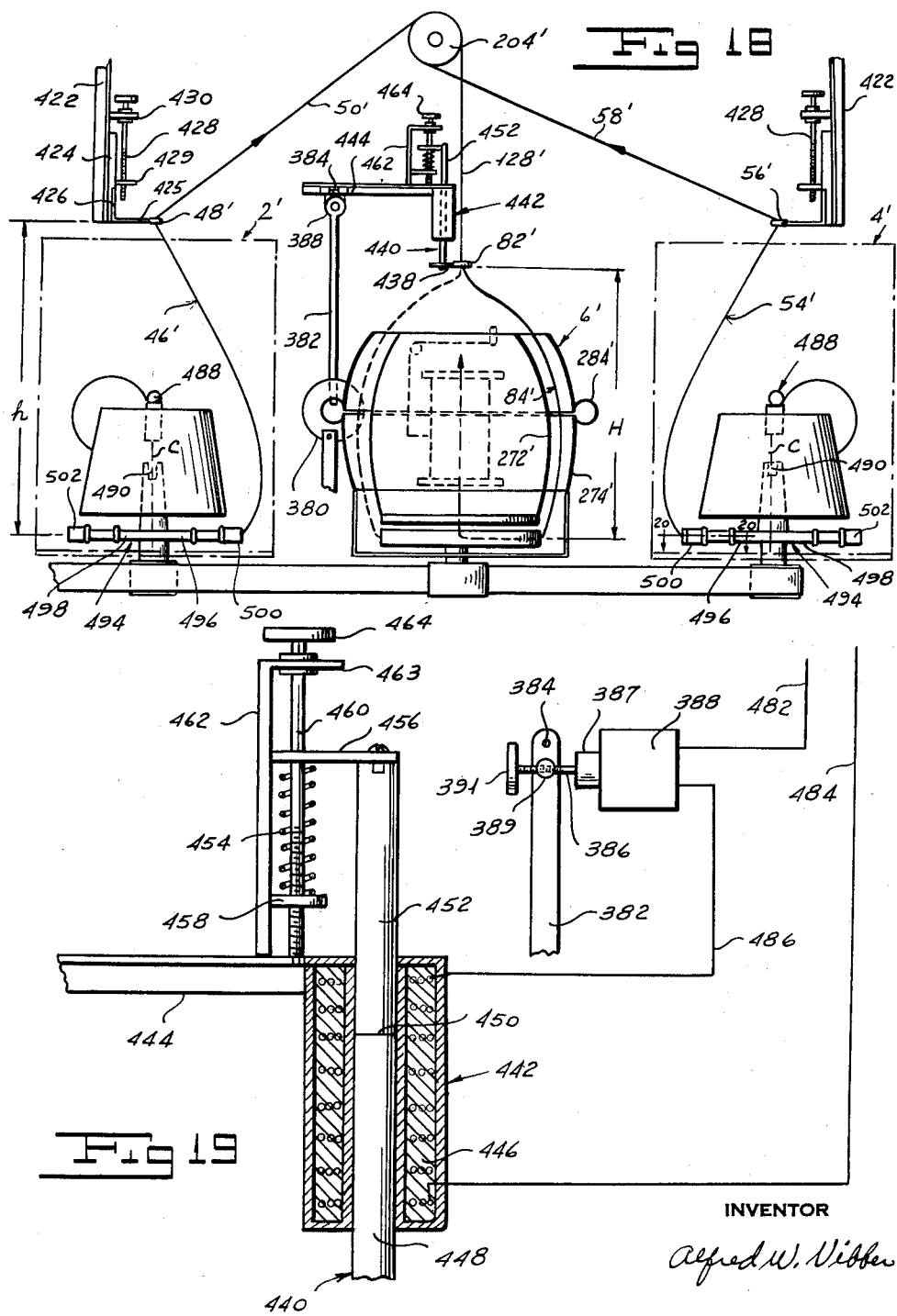
INVENTOR
Alfred W. Vibber

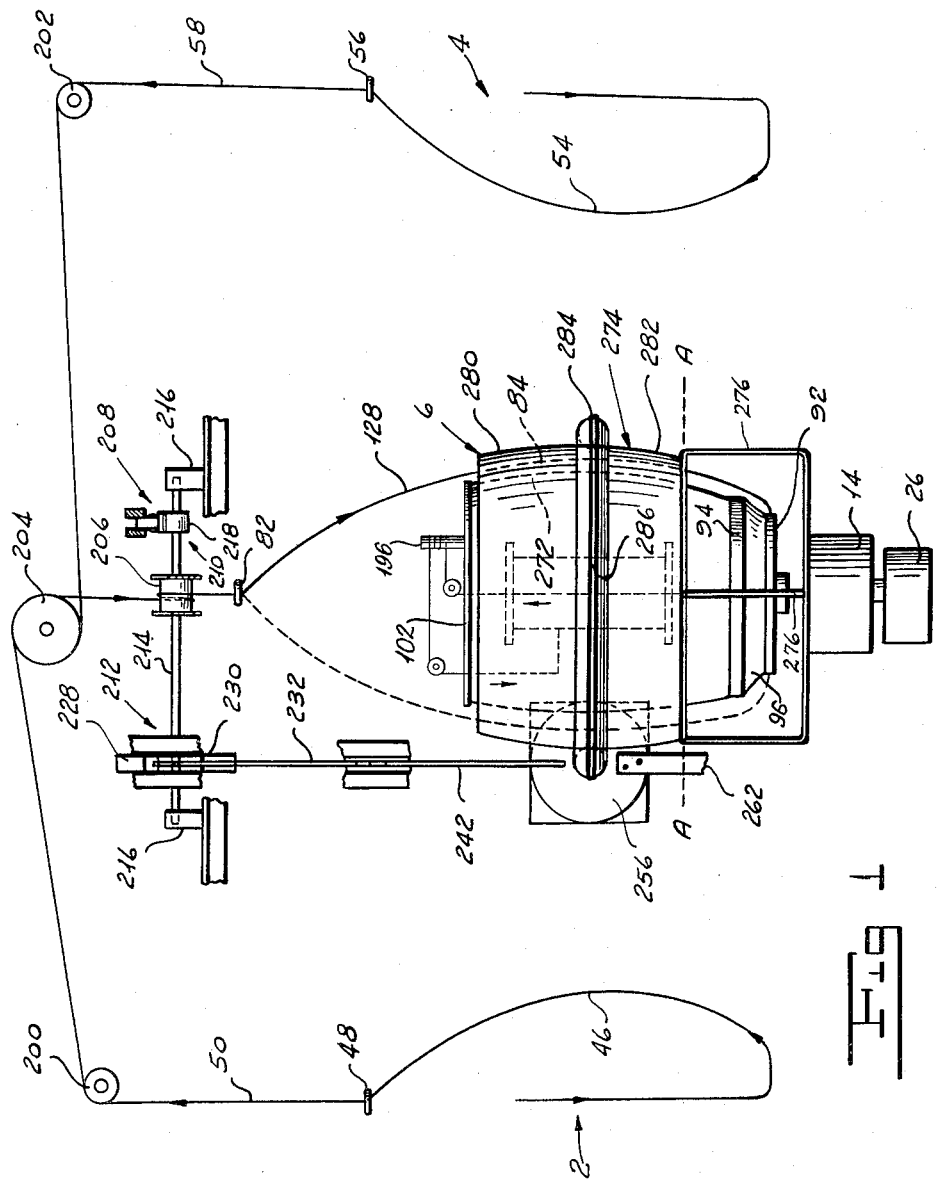

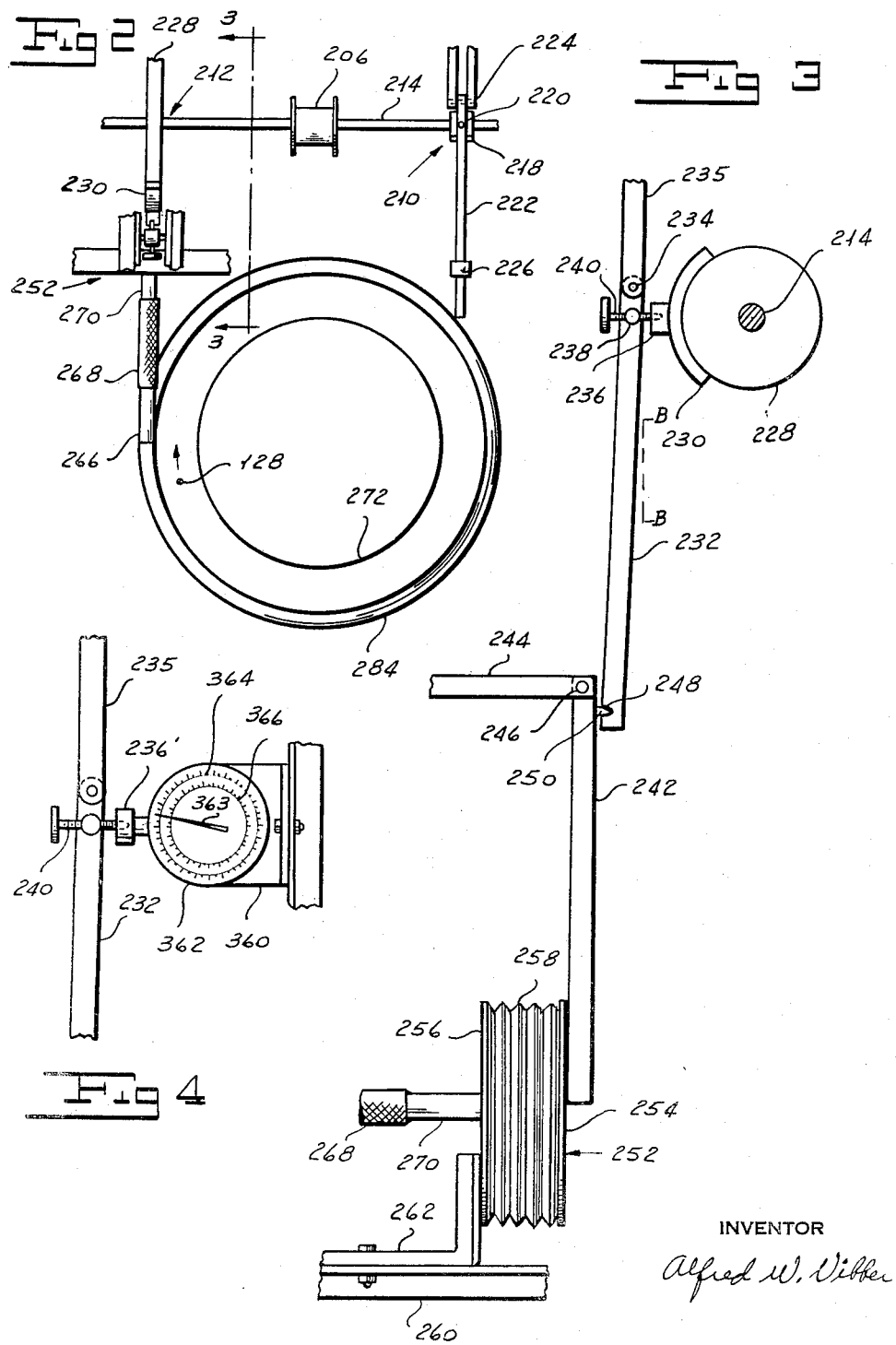

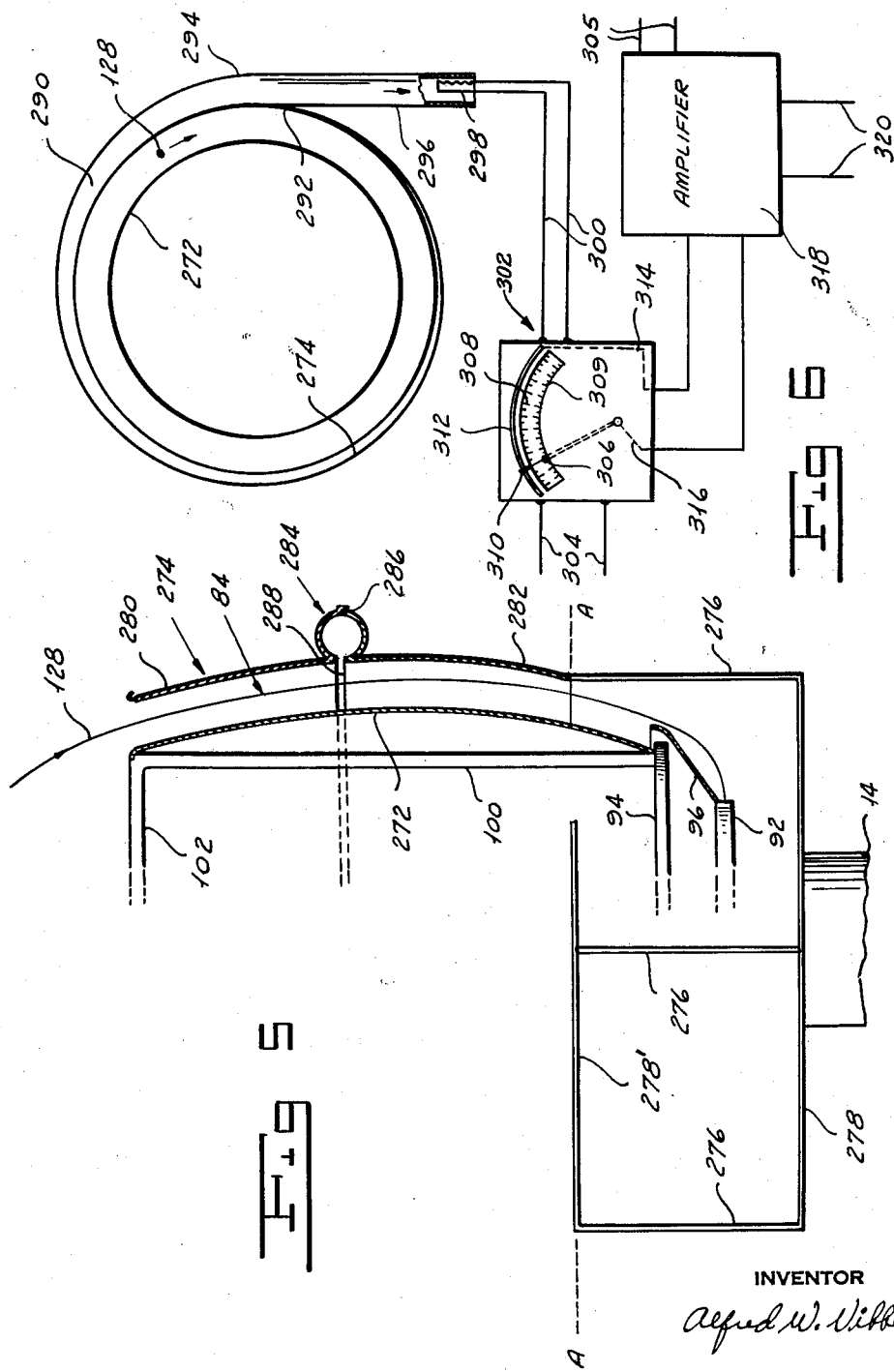

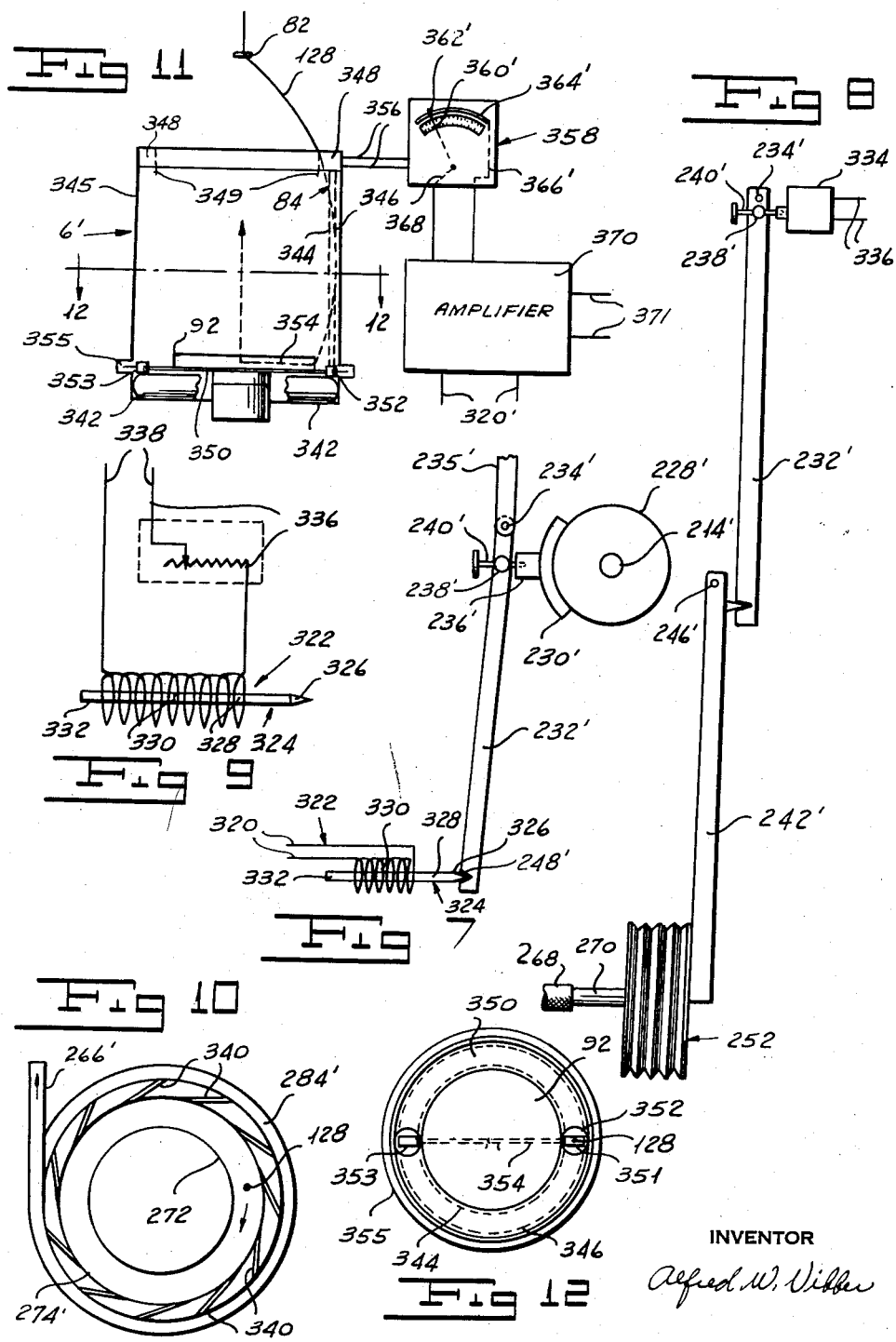

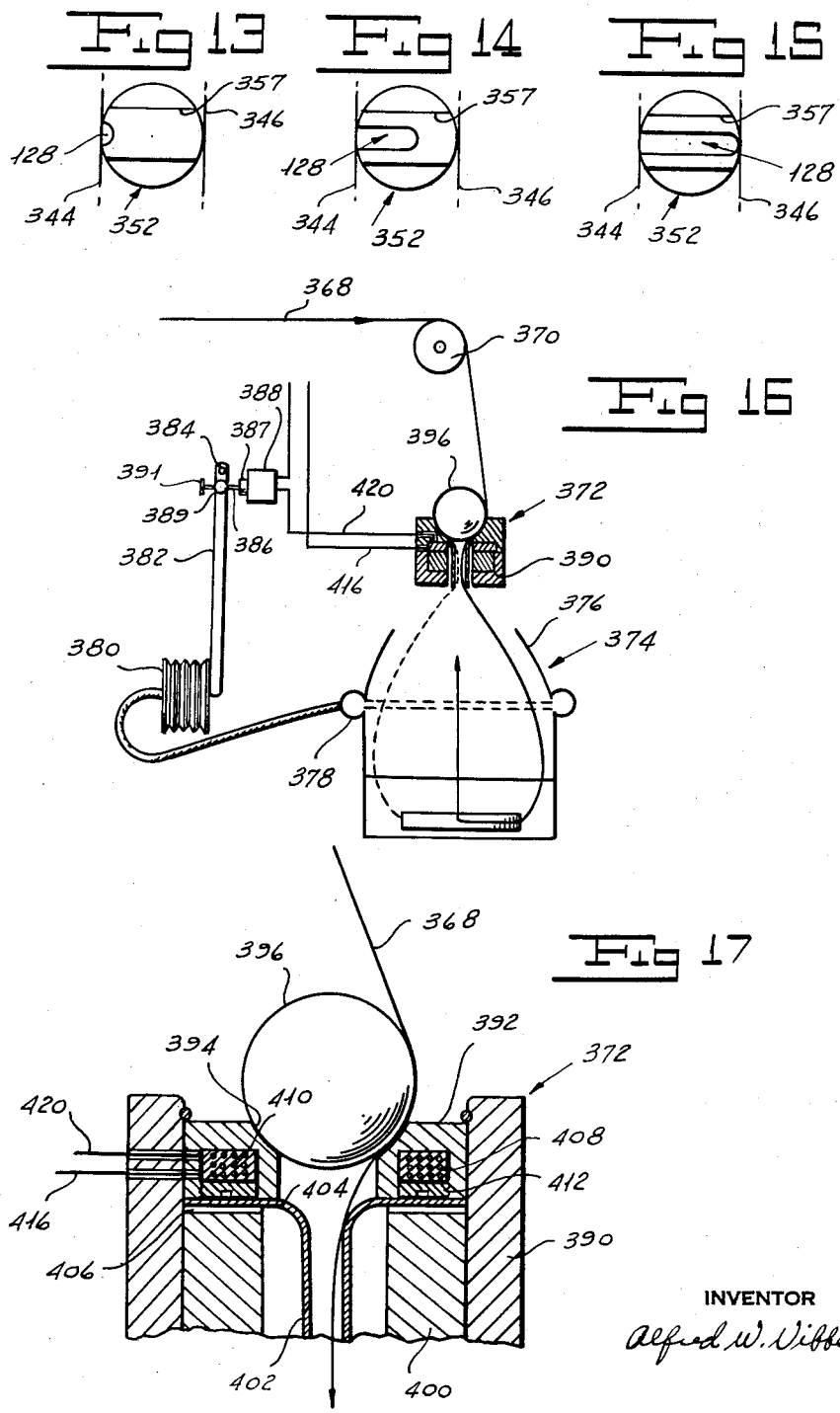

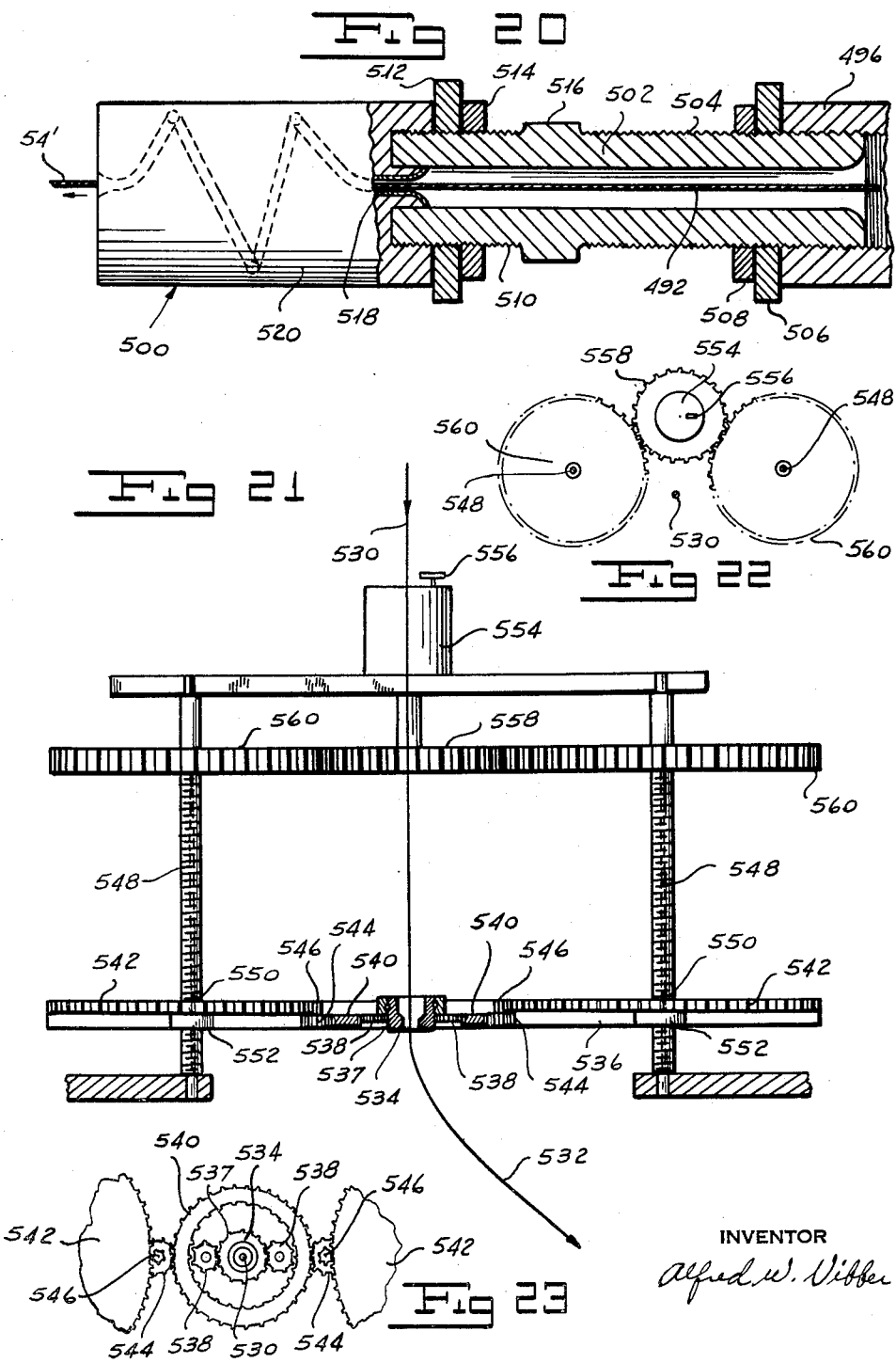

United States Patent Office 2,989,837
Patented June 27, 1961

2,989,837
TWISTING SPINDLE BALLOON CONTROL
Alfred W. Vibber, 116 Pinehurst Ave., New York 33, N.Y.
Filed Jan. 22, 1960, Ser. No. 4,040
65 Claims. (Cl. 57—58.55)

This invention relates to a method of and an apparatus for continuously measuring the diameter of a rapidly rotating object. More specifically, the invention relates to a method of and apparatus for measuring the diameter of a free-flying loop or balloon of elongated flexible material such as yarn, as in a yarn twisting spindle. The invention further relates to a method of and an apparatus for continuously measuring the diameter of such flying loop of balloon of elongated flexible material associated with a twisting spindle and for automatically and continuously controlling the diameter of such balloon in accordance with such measurements. The invention may be applied to both uptwisters and downtwisters; in the illustrative embodiments the spindles controlled are of the infeeding or downtwister type.

This application is a continuation-in-part of application Serial No. 214,866, filed March 10, 1951, now abandoned.

As above stated, in its broader aspects the present invention is concerned with the measurement of the diameter of rapidly rotating objects. One particular object of such kind is the aforesaid flying loop or balloon of elongated flexible material associated with a twisting spindle. It is very difficult, if not impossible, rapidly to measure the diameter of such balloon by known methods and apparatus. The balloon cannot readily be contacted by a measuring instrument while it is rotating, since to do so would scuff the material in the balloon and would also tend to cause a breakage of the material in the balloon. The balloon, of course, ceases to exist when the flyer which creates and maintains it is stopped from rotation.

Possible known methods of measuring such balloon include the sighting along opposite sides thereof, as with a transit, but such operation takes too long if any use is to be made of the measurement in the continuous and instantaneous controlling of the balloon, since the balloon very frequently tends rapidly to fluctuate in diameter. As above indicated, in specific embodiments of the invention use is made of the continuous measurements of the diameter of the balloon in controlling such diameter. It has formerly been attempted, in apparatus in which the tension produced in a balloon at the take-up twisting spindle has been balanced against the one or more balloons of the one or more supply spindles, to position a fixed tension imposing device between such supply balloon or balloons and the take-up balloon. Since the tension in such balloons (and thus in the spans leading from them and to them, respectively,) does not stay constant, due to minute variations in the gauge and moisture content of the elongated flexible materials such as yarn, and thus of the weight of the material in each balloon, it is not possible to maintain a substantially constant diameter of the take-up balloon by use of a tension compensating means which imposes a fixed retarding tension on such material.

It has also been attempted to employ a variable retarding means between the supply and take-up balloons, such retarding means being variable in response to the variations in tensions of the material travelling therepast. Such devices, however, have been complicated, difficult to maintain, and whereas, when they worked, if they did maintain the size of the take-up balloon within fairly narrow limits for appreciable lengths of time, they did so only as a fairly reliable concomitant result, and not as a result of first, establishing a standard desired predetermined take-up balloon diameter, second, measuring variations in diameter of such take-up balloon from such standard diameter, and, third, employing such variations from the standard in diameter to vary the tension in the balloon thereby to insure the maintenance of the diameter of the balloons substantially constant.

The control of the balloon of infeeding spindles, wherein the strand leaves the balloon and travels radially inwardly of the balloon-generating flyer, has been particularly difficult. The balloon controlling mechanism of the present invention, although obviously not limited to infeeding spindles, displays some of its greatest advantages when employed to control the balloons of infeeding spindles.

Generally the apparatus of the invention, insofar as it relates to the measurement of diameter of a rapidly rotating body, is shown and described in three preferred embodiments:

(A) An air column is set up adjacent to and in communication with the vortex of air accompanying the periphery of the object whose diameter is to be measured, and the pressure in such column of air is continuously and instantaneously measured;

(B) An air column similar to that described in (A) above is set up adjacent the object, and the speed of the jet of air escaping from such column is measured; and (C) A photo-electric scanning system is here employed, the amount of light reaching the photoelectric cell from the light beam which is intercepted by the balloon of the twisting spindle when such balloon has a diameter within desired predetermined limits giving a measurement of the instantaneous diameter of such balloon.

In (A), (B), and (C) above, the pressure and speed measurements, respectively, may readily be converted, as by calibration of the measuring instrument, so that such measurements may be read directly in terms of diameter of the object being measured.

In further embodiments of the apparatus and method of the invention, the methods and apparatus of (A), (B), and (C) above, used for measuring the diameter of the object, are further employed to control the tension in the elongated flexible material in the balloon being measured. In certain specific embodiments of the apparatus to be described, the tension of such material in the balloon is varied in accordance with changes in the measurement of diameter of the balloon, thereby to maintain the balloon diameter substantially constant.

In another specific embodiment of the invention, the device measures the diameter of the balloon either directly or as a function of the expansive force exerted on the eye at one end of the balloon, such measurements in turn being employed automatically to vary the tension of the material in the balloon by altering the height of the balloon.

The invention will be more readily understood by reference to the accompanying drawings forming a part of the specification.

In the drawings:

FIG. 1 is a somewhat diagrammatic, over-all view, in side elevation of a twisting and doubling apparatus for forming cord from yarns, such apparatus embodying the preferred embodiment of the balloon control apparatus described as a means for controlling the diameter of the center, take-up, balloon;

FIG. 2 is a fragmentary view in plan of the apparatus in the vicinity of the center, take-up, spindle, showing the primary and secondary tension imposing means and their relationship with the center spindle;

FIG. 3 is a view in vertical section through the apparatus showing the secondary tension imposing means, the section being taken along the line 3—3 in FIG. 2;

FIG. 4 is a fragmentary view in side elevation of an alternative embodiment of the apparatus of the invention, employed for measuring the instantaneous diameter of the balloon at the center spindle;

FIG. 5 is a view, partially in side elevation and partially in vertical section, the section being taken along the axis of such center spindle;

FIG. 6 is a diagrammatic layout of an alternative embodiment of the means for controlling balloon diameter of the present invention;

FIG. 7 is a view in side elevation of an electromagnetic brake which may be employed as the secondary tension imposing means used in connection with the apparatus shown in FIG. 6;

FIG. 8 is a view in side elevation of an alternative balloon diameter measuring device which, when employed in combination with the apparatus of FIG. 7, may be substituted for the secondary tension imposing device of FIG. 3;

FIG. 9 is a somewhat diagrammatic view of an electromagnetic brake applying solenoid and the wiring system thereof, which may be employed with the apparatus shown in FIG. 8;

FIG. 10 is a diagrammatic view in plan of an alternative air-column-establishing means employed in conjunction with the spindle whose balloon is to be measured;

FIG. 11 is a somewhat diagrammatic view of a still further embodiment of the balloon measuring and balloon control apparatus of the invention, such apparatus employing a photoelectric scanning mechanism;

FIG. 12 is a view in horizontal section through the spindle of FIG. 11, the section being taken along the line 12—12 in FIG. 11;

FIG. 13 is a view in plan of the optical slit and lens means 352 when the cord 128 in the balloon is just entering such slit from the inner boundary line 344;

FIG. 14 is a similar view of the slit and lens when the cord 128 occupies its medial position;

FIG. 15 is a similar view of such slit and lens when the balloon 84 has expanded so that the cord 128 lies along the outer boundary line 346;

FIG. 16 is a diagrammatic view of a still further embodiment of the balloon diameter measuring means and the balloon control apparatus of the invention;

FIG. 17 is an enlarged view in vertical axial section through the retarding tension imposing means shown in FIG. 16;

FIG. 18 is a scomewhat diagrammatic view in side elevation of a still further embodiment of the three-spindle yarn twisting and doubling apparatus generally along the lines of that shown in FIG. 1, the apparatus of FIG. 18 varying the tension in the take-up balloon by variation of the vertical position of the guiding eye above the balloon;

FIG. 19 is a view partially in cross section of the eye positioning solenoid of FIG. 18 and of the wiring diagram for such apparatus;

FIG. 20 is a fragmentary view partially in side elevation and partially in horizontal cross-section through the active arm of the flyer of the apparatus of FIG. 18 the section being taken along the line 20—20 in FIG. 18;

FIG. 21 is a view in side elevation of a still further embodiment of the apparatus of the invention, such apparatus measuring the diameter of the balloon as a function of the expansive force exerted by the balloon on the eye at one end thereof, such measurement being employed automatically to vary the tension in the balloon by altering the height of such balloon;

FIG. 22 is a schematic view in plan of the apparatus of FIG. 21; and

FIG. 23 is a schematic view of the gearing between the eye and the worms of the last disclosed embodiment.

As will be apparent from the above, seven main embodiments of apparatus in accordance with the invention are shown herein:

(1) FIGS. 1–3, incusive, and 5,
(2) FIG. 4,
(3) FIG. 6,
(4) FIGS. 11–15, inclusive,
(5) FIGS. 16 and 17,
(6) FIGS. 18, 19, and 20,
(7) FIGS. 21–23, inclusive.

The embodiment of the general combination of apparatus, to which the mechanism of the invention is applied, shown in FIGS. 1, 2, 5, and 11, is generally of the type shown and described in the patents to Uhlig, No. 2,487,837, issued November 15, 1949, and No. 2,654,211, issued October 6, 1953. Such apparatus consists of three spindles, spindles 2 and 4 being of the two-for-one singles supply type, the yarn being delivered therefrom in balloons 46 and 54, respectively, through guiding eyes 48 and 56, respectively, to combining or doubling and retarding tension imposing mechanism, from which it is delivered as doubled cord 128 into the infeeding balloon 84 of the central cabling and twisting spindle 6. Spindle 6 is likewise of the two-for-one twisting type, the combined threads receiving a first twist in their passage through the incoming balloon 84 and a second twist in their travel vertically axially through the center driving shaft of the spindle. Upon emerging from the top of such center hollow shaft, the cord is engaged by the positively driven capstan 196 driven in synchronism with such shaft so as to supply the power to withdraw the cord from the balloon 84 to overcome the retarding tension of the tension imposing means and to withdraw the singles from their balloons 46 and 54. After leaving the capstan, the cord is wound upon a driven rotatable bobbin, being laid therein by a reciprocating traverse mechanism.

FIGS. 16 and 17 disclose an embodiment of the invention wherein the balloon of an uptwister is controlled. In the other disclosed embodiments of the invention relating to balloon control, the balloon controlled is that of a take-up, infeeding or downtwister, such as that shown at 84 in the system of FIG. 1. Experience has shown that there is little, if any, difficulty in the control of the singles balloons when proper adjustment is made of the retarding tension imposing means at the top of each singles spindle. Difficulty has been experienced with control of the take-up balloon 84, wherein if the balloon is too tight it rubs upon the upper rub-ring 102 to the consequent damage of the cord, and, if such balloon is too loose, it rubs upon the outer guard member, if one is used, also to the damage of the cord. If no such guard is used, the balloon very quickly becomes entangled with the balloons 46 and 54 of the singles spindles if it expands to overlap such balloons.

The balloon control apparatus of the present invention is designed to hold the diameter of the take-up balloon within close limits, so that such balloon neither contacts the inner wear ring or inner guard nor contacts the outer guard or housing member.

In the embodiment of the apparatus shown in FIGS. 1, 2, 3, and 5, the singles supply spindles 2 and 4 may be driven as shown, at the same constant high speed and in the same direction by means of a belt (not shown) entrained over the pulley of a motor (not shown) and over driving pulleys (not shown) on each of spindles 2 and 4 of a motor (not shown). The central cabling spindle 6 is driven in the opposite direction at a slightly slower but constant high speed by contact of such driving belt with pulley 26.

To guide the air vortex employed as a balloon measuring means in preferred embodiments of the apparatus, concentric inner and outer guard members are employed at the upper portion of spindle 6 adjacent the largest diameter of the balloon 84. Such inner guard member 272 rests, as shown, upon the outer edge of the bottom, cage forming, member 94 which, as in the aforesaid Uhlig patent, is counterweighted at one side by means not shown so as to hold it, when it is positioned at a slight angle to the vertical, in stable but rockable position. The upper end of the inner guard member 272 is positioned over and thus stably held by the erstwhile rub ring 102. The outer guard member 274 extends to the top of the spindle and down to the level denoted by the line A—A, resting upon an open framework consisting of the fixed horizontal plate 278, the vertical wires 276, and the upper annular wire 278'. Such open work support for the bottom of the guard 274 affords the ready escape in a radial direction of the air vortex stirred up by rotation of the flyer member 92 and the upwardly dished guard member 96 affixed thereto, so that little, if any, of the air attributable to such vortex finds its way into the zone between the inner and outer guard members at the vicinity of the inner end of the air column forming a part of the diameter measuring and detecting means of the invention. Further details of the center spindle and of the balloon diameter detecting means will be described hereinafter.

The twisted singles 50 and 58 proceed upwardly from the balloons of their respective spindles 2 and 4, over the idle guide pulleys 200 and 202, respectively, and thence to the idle gathering pulley 204, from which the combined generally parallel but as yet untwisted-upon-each-other threads are led to the drum 206 of the tension imposing means. After passing around drum 206 several times, thereby to minimize slippage between it and the drum, the combined material 128 is led downwardly through the eye 82 and thence into the incoming or infeeding balloon 84 of the spindle 6. The tension imposing drum 206 is, in the embodiment shown, under the control of a primary retarding or braking means 210 and of a secondary retarding or braking means 212. Drum 206 is mounted upon the rotatably mounted horizontal shaft 214 which, as shown, is mounted in the pillow blocks 216 supported on appropriate portions of the machine frame. The primary retarding or braking means 210 is designed to impose, once the machine has been placed in operation and adjusted, a constant retarding torque upon the drum 206. The secondary retarding or braking means 212 is designed to impose upon the drum 206 a small medial tension when the balloon 84 is of the desired diameter, to impose a constantly increasing retarding force on the drum as the balloon 84 expands, and to impose upon drum 206 a constantly decreasing retarding force as balloon 84 contracts in diameter, thereby to maintain the balloon 84 of substantially constant diameter.

The construction of the primary retarding means 210 is shown more clearly in FIG. 2. As there shown, there is secured to the shaft 214 a relatively small brake drum 218. Pivoted to a portion of the machine frame, as shown in FIG. 2, by means of the pivot pin 224, is a brake lever 222. Pivoted to such brake lever at a position above brake drum 218 is a brake shoe 220, the brake shoe being held against the brake drum with an adjustable force by means of the slidable U-shaped weight 226 which may be positioned on the brake lever at predetermined adjustable distances from the pivot pin 224. Means 210, therefore, after once being adjusted and with the machine in operating condition will impose upon the drum 206 a constant retarding torque.

The secondary retarding means 212 comprises, as shown, a large brake drum 228, likewise affixed to shaft 214, a brake shoe 230 cooperating therewith, (FIG. 3) and means to thrust such brake shoe against brake drum 228 with varying force, such brake shoe operating mechanism being under the control of a balloon diameter detecting or measuring device. The brake shoe operating mechanism, in the embodiment shown in FIGS. 1, 2, and 3, consists of a first lever 232 pivoted at its upper end by the pivot pin 234 to the depending frame member 235. Secured to the upper end of lever 232 immediately below pivot pin 234 is the sidewardly projecting boss member 238 which threadedly receives therethrough the screw member 240 which, as shown, is provided with an adjusting handle. The inner end of screw 240 is rounded and smooth, being received within a slightly larger correspondingly shaped recess in the projection 236 on the rear of the brake shoe 230. The described mechanism permits the brake shoe 230 to be initially applied to the brake drum 228 with a known pressure resulting from the thrusting of brake lever 232 clockwise by adjustment of screw 240 to a position slightly off the vertical, as indicated by the vertical dotted line B—B in FIG. 3. Thus, under static conditions the secondary brake applies a small known retarding force to the drum 206 by reason of the effect of gravity upon lever 232.

To such small static retarding there is added, under running conditions of the machine, a retarding force which bears a direct, empirical, relationship to the diameter of the balloon to be controlled. In FIG. 3 such additional retarding force is shown as being applied by a second brake lever 242 pivoted by pivot pin 246 on member 244 of the frame of the machine. Immediately beneath pivot pin 246 there is provided on lever 242 a knife edge 250, the forward end of which is received within the somewhat more obtuse V-shaped recess 248. The thus described lever system allows an enormous multiplication of the force applied to the lower end of the lever 242 as compared to the force applied by the shoe 230. Since the various parts of the lever system are tightly thrust against each other, and since a more forceful application of shoe 230 against drum 228 requires substantially no motion of the lower end of lever 242, the application of an increased force at the bottom of such lever is almost instantly transmitted to the brake shoe.

In the embodiment of FIGS. 1, 2, 3, and 5, such increased force on the bottom end of lever 242 is supplied by means of the bellows device 252, the forward wall 254 of which is rigid in character and is connected to such lever. The rear wall 256 of the bellows, likewise of rigid character, is secured to the bracket 262 which is adjustably attached to the port 260 of the frame member. The walls 254 and 256 of the bellows are connected by the pleated flexible side wall member 258. Air under pressure is led to the bellows through the inlet tube 270 which is connected by means of the flexible hose 268 to the manifold 284 on outer guard 274 through the outlet pipe 266 thereof, as shown in FIG. 2. It will be apparent that increased pressure in the air column comprising the manifold 284, the delivery tube 266, hose 268, and inlet pipe 270, will be almost instantly transmitted to the bellows 252 which acts as a force multiplying device in accordance with the area of the forward wall 254. The manner in which the air pressure varies in such column in the manifold and connected tubing in accordance with balloon diameter changes and the mode of initial adjustment of the secondary and primary brake devices 212 and 210, respectively, will be discussed in detail hereinafter.

As an alternative to using the structure of FIG. 3 in conjunction with the detecting manifold or air column positioned in direct communication with and adjacent to the air vortex of the balloon to be measured and controlled, there may be substituted for the brake means 230, 228 of FIG. 3 a calibrated scale device 360 as shown in FIG. 4. Such scale device, which is mounted upon a fixed vertical portion of the frame of the machine, has a dial 362 and a rotating hand 363 cooperating therewith, such hand indicating the pressure exerted upon scale pan 236' by means of the adjustable pin 240, the rounded forward end of which fits within a suitable depression in the scale pan. The dial 362 is provided with two scales 364 and 366, the former being calibrated so that the hand 363 indicates directly thereon the speed of the air vortex in that portion in communication with the column of air in the detecting means, and the scale 366 indicating directly the pressure of the air in such column. This is possible on one dial, because with components including the air column, levers, and so on of fixed known size, the speed of that portion of the air vortex accompanying the balloon in communication with the inner end of the air column bears a definite empirical relationship to the pressure in such air column.

In its preferred embodiment, shown in FIG. 5, the portion of the air column defining means immediately adjacent the balloon of the twisting spindle takes the form of an annular manifold 284 which is an integral part of the outer guard member 274. As shown, substantially one-half of the manifold is formed as an upwardly open trough on the upper edge of the lower part 282 of the outer guard member, the upper portion of such manifold being formed as a downwardly open trough on the lower edge of the upper portion 280 of the outer guard. The upper portion of the manifold is formed (FIG. 5) on its outer edge with a downwardly extending flange and a shoulder inwardly thereof, so that the shoulder rests upon the upper edge of the lower half of the manifold, thereby supporting both the upper part of the manifold and the upper part 280 of the outer guard on the lower part of the manifold. A suitable gasket 286 may be employed at the thus formed joint in the manifold.

The inner edges of the top and bottom portions of the manifold are spaced when the manifold is assembled, to provide therebetween a continuous annular slot 288 which is in communication with the manifold. Such slot forms the inner end of the air column relied upon for both measurement and control of the diameter of the balloon, such air column including the air in the manifold 284 and that extending through delivery tube 266, flexible tube 268, and inlet tube 270, and the air in the expansible chamber 252. It will be apparent, that, by reason of the provision of the inner guard 272 and the outer guard 274, the air vortex accompanying the balloon 84 is confined to flow substantially annularly with such balloon. The air in such vortex is impelled centrifugally outwardly against the outer guard 274, which, by reason of its being in the shape of a truncated prolate spheroid, generally parallel to the balloon, tends to guide the air thrown from the vortex into the slot 288, rather than outwardly through the upper and lower open ends of such space between the inner and outer guards.

The pressure of the aforesaid air column having its inner end at the slot 288 affords a measurement of the speed of the air vortex accompanying the balloon 84 and also the distance of the material 128 in the balloon 84 from the slot 288. Such varying pressure in the air column can, therefore, be employed as a means for measuring the speed of such air vortex and consequently the speed of the balloon and can also, as above noted, be employed to impose suitable varying tensions on the material in the balloon, whereby to control the balloon, preferably to maintain the balloon substantially of constant diameter. The variation of air pressure in the air column upon variation in diameter of the balloon 84 has two causes (1) the material in the balloon acting within the space between the inner and outer guards acts as a rudimentary centrifugal air blower. The amount of air which is forced into the slot 288 is naturally greater when the material 128 of the balloon lies close to such slot than when the material of the balloon lies more remote therefrom. The second of such cases (2) is the fact that as the balloon 84 expands the material in it travels at an increased speed, the speed of such material being directly proportional to the diameter of the balloon. Consequently, the air vortex accompanying such balloon of increased diameter travels at a higher speed, and an air column in communication with the outer edge of such vortex naturally is subjected to a higher pressure, since, as noted, such pressure bears an empirical known relationship to the speed of the vortex. The combination of such two effects, therefore, gives a noticeable variation in pressure in the air column upon variation in the diameter of the balloon, the pressure increasing as the balloon expands and decreasing as the balloon contracts.

The change in pressure in such air column is transmitted almost simultaneously to the forward wall 254 of the expansible chamber 252. From there the force is transmitted through the lever system 232, 242, to the brake shoe 230. By suitable choices of the area of the wall 252 of the expansible chamber and of the mechanical advantage of the lever system 232, 242, there can be applied to the brake shoe 230 a force which is thousands of times greater than the pressure in the air column.

In a typical twisting operation the apparatus will be initially adjusted so that the primary retarding means 210 imposes, say, a retarding force of 1790 grams to the material passing around pulley 206 and so that, when the balloon 84 occupies a medial position in the space between the inner and outer guards, the secondary retarding means 212 will apply a retarding force of ten grams to the material passing around pulley 206, assuming that for the operation in hand a total medial retarding force of 1800 grams is required. The 1790 grams applied by means 210, of course, remains constant. Should the balloon 84, after the machine has reached a steady operating condition, then expand so that it becomes increasingly close to the slot 288, with a suitable choice of component sizes the retarding force applied to material 128 by means 212 will rise from ten grams to, say, twenty grams. This, in the particular operation described, will be sufficient to restore the balloon 84 to its medial position, or it may be sufficient to cause it to overrun such medial position. Upon such undue contraction of the balloon, the retarding force applied by means 212 will decrease to, say, five grams, whereupon the balloon 84 will become fuller and tend to regain its medial size. It is thus apparent that the described means affords a ready means for controlling the diameter of the balloon 84 so that it will remain substantially constant. Furthermore, the changes in retarding tension applied by means 212 will be gradual and will almost instantly accompany changes in the position of the balloon and thus changes in pressure in the air column. Consequently the balloon will tend to remain steady without much, if any, "hunting."

Although the above described apparatus is that presently preferred for both measuring the diameter of the balloon and for controlling such diameter, both such results may be attained by other apparatus which operates on at least generally the same principle. Thus, in the apparatus diagrammatically shown in FIG. 6, there is employed a device which both measures the diameter of the balloon instantaneously and controls its diameter by detecting the speed of a jet of air thrown off by the air vortex accompanying the balloon. In FIG. 6 the inner guard member is designated 272, the outer guard 274, and the manifold about such outer guard in the location of the maximum girth of the balloon formed by material 128 is designated 290. As shown, such manifold 290 which is generally of the same shape in axial cross-section at its inner edge as the manifold 284 in the first embodiment, is constructed in plan so that its peripheral wall is of spiral shape, the manifold having a substantially zero area in radial cross-section at the point 292 and increasing to a maximum radial cross-section at the point 294. Such shape approximates the shape of the housings of conventional centrifugal pumps, and facilitates the flow of air from the jet 296, which is in communication with the manifold at its area of greatest cross-section. Positioned in the jet 296 is the resistance wire of a conventional hot-wire anemometer. The jet of air in jet 296 impelled by the material 128 in the balloon varies in speed with the distance of such material 128 from the outer wall or guard 274, and thus from the slot at the inner edge of the manifold. Accordingly, the cooling effect upon resistance 298 by the travelling air in the jet affords a measurement of the distance of material 128 from such outer wall and consequently affords a measurement of the diameter of the balloon. Lead wires 300 extend from resistance 298 to the sensitive galvanometer 302 which is supplied by leads 304 from a suitable power source. The change in resistance of resistance 298 is indicated by the galvanometer needle 306, which cooperates with the fixed scales 308 and 309, scale 308 being calibrated to give directly the speed of the air in jet 296, and scale 309 being calibrated to read directly the pressure in such jet, which is possible since with a known size of jet the air speed and pressure bear known relationships to each other.

The needle 306 is provided with an electrically conducting extension 310 which slides upon a linear resistance member 312 positioned above the scales. Resistance member 312 is connected at its right-hand end through wire 314 to the amplifier 318. The needle 306 is connected at its pivot through the wire 316 to such amplifier. As the speed of the air in jet 296 increases, therefore, the resistance in the input circuit of the amplifier decreases and accordingly the voltage output across the wires 320 of the amplifier, which is supplied through power leads 305, affords a direct measurement of the speed of the air in jet 296, the pressure of the air in such jet, and the distance of material 128 from the outer guard of the twisting spindle. The current output from wires 320 may be employed to operate a secondary braking or tension imposing means, whereby to maintain the diameter of the balloon of the spindle substantially constant.

A suitable alternative secondary tension imposing means, fed by output wires 320 of the apparatus of FIG. 6, is shown in FIG. 7. In such figure, parts of the apparatus which are similar to those in FIG. 3 are denoted by the same reference characters with an added prime. Since auxiliary power is available in this embodiment to operate the secondary tensioning imposing means, but one lever 232' is necessary. To press against the lower end of such lever there is employed the solenoid 322 which is connected to the amplifier of FIG. 6 through the wires 320. Solenoid 322 is provided with a plunger 324, the right-hand end of which is provided with a knife edge 326 which cooperates with the V-shaped recess 248' in the lower end of lever 232'. The right-hand end of the plunger, designated 328, is of non-magnetic material, whereas the left-hand end 322 thereof, beyond junction 330 is of magnetic material.

Brake lever 232' is preferably adjusted so that it makes a small angle with the vertical, whereby when no current is impressed upon wires 320 the brake shoe 230' presses upon brake drum 228' with a small pressure due to the effect of gravity upon the system. When a current is impressed upon wires 320, generated by the system of FIG. 6 when the balloon occupies a medial position, the braking system of FIG. 7 will apply a medial retarding force to the pulley 206. Suitable adjustment of the primary retarding means 210 will thereupon result in a predetermined desired total tension when the take-up balloon occupies its medial position. When the balloon expands, the voltage in wires 320 increases, thereby impelling plunger 324 to the right in FIG. 7 and thereby adding to the retarding effect of the secondary braking means. When the balloon contracts, the voltage in wires 320 decreases and the secondary braking means imposes a smaller retarding force on the pulley 206. The apparatus of FIGS. 6 and 7 therefore can be employed both for measuring the diameter of the balloon and also for maintaining it of substantialy constant size.

A still further modification of the braking system which may be employed in the first described embodiment shown in FIGS. 1, 2, and 5, is shown in FIGS. 8 and 9. In FIG. 8 a compound lever system is shown similar to that shown in FIG. 3, similar parts being designated by the same reference characters as employed in FIG. 3 with an added prime. In FIG. 8 the lever system acts, not upon the secondary tension imposing means directly as in FIG. 3, but upon a carbon granule resistor 334, which is of conventional design and so constructed that substantially no motion of the plunger is necessary, the resistance across lead wires 336 therefrom decreasing in accordance with the pressure imposed upon the plunger of the resistor.

In FIG. 9 such resistor is shown in a circuit including the electromagnetic brake operating solenoid 332 of FIG. 7. Current through lead wires 338 is led to such solenoid, one side of the line proceeding through the resistor 334. It will be apparent that upon increased pressure in the manifold, and therefore upon the lever system 232', 242', an increased thrust to the right upon solenoid plunger 324 will be realized. Such solenoid plunger will be employed in connection with the braking system shown in FIG. 7, thereby maintaining the tension upon the incoming end of the balloons such that the balloon is maintained substantially constant in diameter.

In FIG. 10 there is shown an alternative embodiment of the manifold design. In such design the same inner guard member 272 is employed as in FIG. 5, the manifold 284 being replaced by the annular pipe 284' which is spaced radially of the outer guard 274'. Such outer guard is similar to in shape, but larger than, the inner guard 272. Connection between such pipe or manifold 284' and the outer guard 274' is effected by one or more tubes 340 which extend from the outer guard substantially tangentially thereto and in the direction of motion of the material 128 in the balloon. The lead-off tube 266' is disposed substantially tangentially to the manifold substantially in the same manner as the lead-off pipe in the embodiment of FIG. 5. It will be understood that the number and size of tubes 340 will vary according to the operation in hand, in some instances only a few or even one of such tubes being needed, particularly when the material 128 is of large diameter in cross-section. When but a few such tubes or only one is needed, the manifold 284' may be dispensed with, such one or several tubes being attached directly to the end of the take-off pipe 266'.

In FIGS. 11–15, inclusive, there is shown an apparatus for controlling the balloon 84 of the take-up and twisting spindle 6' by photo-electric scanning means. Such device continuously measures the diameter of the balloon within certain predetermined desired limits, and, employing such measurements, controls an electromagnetically operated secondary tension imposing means to vary the tension on the entering end of the balloon, whereby to maintain the diameter of the balloon substantially constant.

The elongated flexible material 128 in balloon 84 enters such balloon through the eye 82, is drawn in through the flyer 92, and is coiled in the spindle after having been drawn upwardly from the axially hollow shaft therein in the same maner as it is in the spindle shown in FIG. 5. Spindle 6' is equipped with a cylindrical external guard 345 to the inner top surface of which, out of the path of travel of balloon 84, there is affixed the annular photoelectric cell 348, the bottom side of such annular cell comprising a light-receiving lens, such lens being secured from reception of vagrant light by the aforesaid outer guard of the spindle and by the depending inner light shield 349. The light which falls upon cell 348 is derived substantially solely from the light source 342, which in this instance is an annular fluorescent tube positioned axially of cell 348 and at the bottom of the outer guard of the spindle. To the bottom of the flyer 92 there is affixed the circular shutter-forming disc 350 coaxial with the flyer, the outer edges of such disc protruding into the annular light trap 355 formed on the outer guard of the spindle. The main body of the disc 350 is imperforate except for the collimating lens system 352 positioned at one zone thereof so as to be aligned with the balloon 84 of the material traveling through the spindle. The actual opening through means 352 is substantially in the form of a rectangle having rounded ends, such opening being designated 357 and being shown more particularly in FIGS. 13, 14, and 15. A compensating balancing weight 353 is positioned on the disc 350 diametrally opposite means 352, whereby the disc will rotate at high speeds in perfect balance. As the flyer 92 sweeps around carrying with it the balloon 84, the disc 350 similarly travels, the collimating lens means 352 causing a slit of parallel light beams to travel around the spindle, the inner border of such annular path of the light beams being designated 344 and the outer edge thereof being designated 346. The radial width of such light beam, that is, the distance between lines 344 and 346, is chosen as defining the range within which the diameter of the balloon may permissibly vary.

It is apparent from the above that the output in current from photo-electric cell 348 will vary markedly as the diameter of the balloon varies from the line 344 to the line 346. Thus, in FIG. 13, in which the balloon is shown protruding outwardly but slightly past the line 344, such current output of the photo-electric cell will be at a high value, since such cell receives continuously a beam of light from the portion of the slit 357 which is unobscured by the cord 128 of the balloon. When the balloon has expanded to a medial position, as shown in FIG. 14, the output current of cell 348 will decrease since the photo-electric cell receives light only from the unobscured portion of slit 357, such unobscured portion being markedly smaller than that in FIG. 13. When the balloon has expanded so that it coincides with line 346, as shown in FIG. 15, the elongated flexible material 128 will extend completely across the slit 357, thereby still further obscuring such slit and shutting off the light beam to the photo-electric cell, whereby the current output of such cell is at a minimum.

Such current variation in the output of the photo-electric cell may readily be employed as a means of measuring instantaneously the diameter of the balloon as it varies within the limits between lines 344 and 346. Thus, the output of such cell is led through wires 356 to the sensitive galvanometer 358, the needle 360' of which indicates a reading upon the scale, which scale may be calibrated directly in terms of diameter of the balloon. The galvanometer 358 may be made to control, through a suitable variable resistance and amplifier system, the secondary tension imposing device such as shown in FIG. 7, whereby the diameter of the balloon may be maintained substantially constant. Accordingly, there is positioned on the galvanometer above the scale a linear resistance 364' with which the extension 362' of the needle slidingly cooperates. The right-hand end of resistance 364' is connected by wire 366' to the amplifier 370, the other input wire 368 to such amplifier being connected to the needle 360'. The amplifier, which is fed by power supplied from wires 371, when of suitable known design, will produce at the output leads 320' a voltage which is directly proportional to the effective resistance of the variable resistor composed of parts 362' and 364'. Thus, the voltage across wires 320' will vary in accordance with variations in the diameter of the balloon 84, when the balloon is small the voltage across wires 220' being small and when the balloon is large such voltage being large. In employing the device of FIG. 11 to control the secondary tension imposing means, the apparatus of FIGS. 7 and 11 are employed, wires 320 being connected to wires 320'.

It has been pointed out above that the general combination of singles twisters and take-up and cabling spindle shown in FIG. 1 depicts simply one embodiment of the apparatus wherein the present invention may be employed. In FIGS. 16 and 17 there is shown a take-up spindle receiving a single elongated flexible material 368, the spindle designated 374 being of the two-for-one twisting variety. The material 368 is led down over the idle guiding pulley 370 through the variable retarding tension imposing device 372 positioned at the entering end of the balloon 376. The spindle 374 is provided with an outer guard similar to that employed in the embodiment in FIG. 5, and also with a continuous manifold presenting an open slot to the inside of the guard. The output from such manifold is led through a flexible hose to the expansible chamber or bellows 380, such bellows being operatively connected to the lower end of the lever 382 which, as in previous embodiments, is pivoted at its top at 384, and which through the medium of the adjustable pressure pin 386 functions to thrust against the plunger 387 of a carbon granule resistor 388. The resistor 388 is interposed in one of the lead wires 416 from a suitable power source, such wires leading to a supplementary wound field for the magnetically held ball 396. Ball 396, made of magnetic material such as steel, is supported in a partly spherical seat in the non-magnetic main body 390 of the tension imposing device, being held therein by an annular permanent magnet of high permeability, such magnet being designated 400. Initial adjustment of the magnet 400 toward or away from the ball 396 is effected by the interposition of suitable shims 406 therebetween. Added to the force with which the ball 396 is impelled downwardly into the seat, in addition to gravity, is the effect of the wound field 410 which is contained in the cavity 408 in the seat forming member 392. Cavity 408 is closed by the annular cap member 412 which as shown is screwed into such cavity. The elongated flexible member 368 is brought down between the ball 396 and the seat 392 thence down through the guide tube 402 and into the balloon 376. Because of the rotation of the upper end of the balloon there is imparted to the ball 396 a nutating effect, whereby the material 368 continually is shifted about the seat, wear of such seat and ball in any one position being thereby avoided.

The pressure pin 386 of the operating mechanism for the resistor 388 will be adjusted so that the combined effects of gravity, the magnet 400, and of the wound field 410 upon the ball 396 will give the device 372 the desired retarding tension imposing effect when the balloon 376 is of a medial diameter. Should such balloon 376 expand, increased pressure in the bellows 380 will thrust pin 386 against the plunger of resistor 388 more strongly, thereby decreasing the resistance through means 388 and energizing wound field 410 to an increasingly strong extent. Thereupon, of course, the downward pull upon the ball 396 is increased, and the diameter of the balloon will therefore be decreased. When such balloon decreases unduly in diameter, pressure against the plunger of the resistor 388 will be decreased, and accordingly the resistance through such resistor will increase. Thereupon the field strength of the wound field 410 will decrease, the ball 396 will be held in its seat less strongly, and the tension imposed upon material 368 will be decreased, thereby allowing the balloon 376 to expand. It can be seen that such device will thus maintain the diameter of balloon 376 substantially constant at all times.

In previously described embodiments of the balloon control apparatus of the invention, a tension imposing means has been shown at the entering end of the balloon, both in the three-spindle twisting and doubling apparatus and also in the singles twisting apparatus of FIGS. 16 and 17. In the three-spindle apparatus such retarding tension between the balloons of the singles and the take-up balloon balances the tension of such single or singles balloons against the tension of the take-up balloon, the apparatus of the present invention adding or subtracting a slight amount of retarding tension at such point in accordance with variations in the diameter of the take-up balloon in order to maintain such balloon diameter substantially constant. In the singles twisting apparatus of FIGS. 16 and 17 the variable tension thus imposed upon the entering end of the take-up balloon is for the sole purpose of controlling the balloon.

It has been found possible, with certain twist specifications and with certain materials, both to balance the balloons of the singles spindles against the take-up balloon and also to compensate for variations in diameter of the take-up balloon and to restore it to a desired medial diameter without the imposition of a retarding tension between the singles and take-up balloons. Apparatus for accomplishing such result is shown in FIGS. 18, 19, and 20, wherein the basic parts of such three-spindle twisting apparatus are generally the same as those shown in FIG. 1 and are designated by the same reference characters as in FIG. 1 with an added prime.

The apparatus of FIGS. 18, 19, and 20 generally includes means for adjusting the height of the singles balloons relative to the medial height of the take-up balloon, so that the tensions in the singles balloon balance the tension in the take-up balloon, no additional or compensating tension being necessary between the singles and take-up balloons if the diameter of the take-up balloon remains substantially at its medial value. Such apparatus includes means to compensate for variations in the diameter of the take-up balloon, and to restore such balloon to its medial value, by measuring or detecting variations in the diameter of the take-up balloon by apparatus of the invention previously described, and by varying the tension in the material forming such balloon of the take-up spindle by automatically varying the height of the take-up balloon in accordance with such measurements of variations of the balloon diameter, thereby to restore such take-up balloon to its medial diameter.

As shown in FIG. 18, the height, $h$, which singles guiding eyes 48′ and 56′ lie above the bottom of their corresponding balloon, somewhat exceeds the height, $H$, which guiding eye 82′ of the take-up spindle 6′ lies above the bottom of its respective balloon. The singles guiding eyes are adjustable vertically in their mounting on frame part 422 by means of the vertical guideway 424 mounted on such frame part, the slide 426 from which the eye holding arm 425 protrudes, such slide fitting within guideway 424, and the vertical screw 428. Screw 428 is journalled in the horizontal support 430 and is threadedly engaged with the horizontal projecting member 429 on the top of slide 426. It will be apparent that turning of screw 428 will allow the substantial adjustment of eye 48′ toward or away from the spindle 2′. Identical structure is employed for vertically adjusting the guiding eye 56′ for spindle 4′.

With certain specified twists of the material, and with certain weights of such material, it is possible, by suitable vertical adjustment of guiding eyes 48′ and 56′ and of the radius of the flyer, to balance the combined tensions of balloons 46′ and 54′ against the tension in take-up balloon 84′, when such take-up balloon has its desired medial diameter. Gathering pulley 204′ is, therefore, an idle pulley, imposing no retarding tension on the material passing thereover. The apparatus of FIGS. 18, 19 and 20 incorporates means whereby the vertical position of take-up spindle guiding eye 82′ may be automatically adjusted, in response to variations in the diameter of balloon 84′, so that the tension of the material in such balloon is varied to restore such balloon to its medial diameter.

The eye 82′ is mounted on an arm 438 which in turn is secured to the bottom of the solenoid plunger 440. The plunger 442 is mounted on a frame part 444, as shown, such solenoid plunger being biased upwardly by the coil compression spring 454 which, as more clearly shown in FIG. 19, abuts at its upper end the horizontal arm 456 secured to the upper end of plunger 440 and at its lower end abuts the adjustable abutment member 458. Member 458 is threadedly received on the threaded spindle 460, which is mounted at its top in the horizontal arm 463 on the bracket member 462 secured to the machine frame. Upon suitable turning of the spindle 460 by means of the hand wheel 464, the abutment 458 may be made to rise or fall, thereby to subject the plunger 440 to increased or decreased, respectively, counterbalancing upward bias. The plunger 440 is made in its lower portion 448 of nonmagnetic material such as brass, and is made in its upper portion, above juncture 450, of a magnetic material 452. It will be apparent that upon energizing the coil 446 of the solenoid 442 to a varying degree, the plunger 440 will be impelled downwardly against the action of spring 454. For a certain predetermined degree of energization of the coil 446 there will be, for a given adjustment of spring 454, a definite vertical position of eye 82′ under operating conditions.

The voltage impressed upon coil 446 of the solenoid is supplied by, and is under the control of, a control mechanism which is identical with that shown as employed in FIG. 16. The expansible chamber, the lever, and the carbon granule resistor shown in FIGS. 18 and 19 are, therefore, designated by the same reference characters as are employed for such parts in FIG. 16.

The supply circuit for such mechanism is shown in FIG. 19, wherein wires 482 and 484, leading from a suitable power source, are shown, wire 484 proceeding directly to the solenoid coil and wire 482 being led to the resistor 388. The other lead from the resistor 486 is connected to the other terminal of the solenoid coil.

The apparatus of FIGS. 18 and 19 is adjusted so that the balloons 46′, 54′, and 84′ are in balance as to tension when the take-up balloon 84′ is of a medial diameter. Under such conditions, the eye 82′ is subjected to the upward thrust of the upper end of balloon 84′, the gravitational effect upon parts 82′, 438, 440, and 456, and also to the upward thrust of the spring 454. Also acting upon eye 82′, of course, is the force which the field 446 of the solenoid exerts upon plunger 440 when such field is energized to the degree corresponding to the degree of pressure imposed upon plunger 387 of resistor 388 by the expansible chamber and lever system 380, 382, which in turn are actuated by the pressure of the air column in manifold 284′ generated by the balloon 84′ in its medial position.

Should the balloon 84′ expand, the air pressure in the manifold and expansible chamber will increase, the plunger 387 of the resistor will be subjected to increased pressure, the resistance through resistor 388, will decrease, and the field 446 of the solenoid will thus be more strongly energized. Accordingly, plunger 440 will be moved downwardly to a small extent, carrying with it the eye 82′, and thereby decreasing the height H of the take-up balloon. Thereupon the tension of the material 128′ in such balloon will decrease, due to the decreased length of material in such balloon, and thus such balloon will decrease in diameter. The reverse action takes place when the take-up balloon decreases in diameter from its medial diameter. The changes in tension in the material in the balloon 84′ which are necessary to restore it to its medial position are small, and so such changes do not cause any operating difficulties at the singles balloons 46′ and 54′ once an over-all balance between the singles and the take-up balloons has been established with such take-up balloon at its medial diameter.

As is well known, the tension exerted by balloons 46′ and 54′ depends, in each instance, upon the weight of the material in the balloon and also upon the speed with which such balloon travels about its axis. In order to allow wider variations in these factors than would be permissible by the use of the vertically adjustable eyes 48′ and 56′ alone, spindles 2′ and 4′ are preferably provided with the novel flyer and tension arrangement shown diagrammatically in FIG. 18 and more specifically in FIG. 20.

It is usually necessary to provide in spindles 2′ and 4′ a tension means additional to the adjustable magnetic ball tensions 488 shown at the top of the spindles, both because such magnetic ball tension devices are limited as to the total force which they can impose upon the yarn, and also because the yarn, when engaged by such means, is in flat untwisted condition and therefore lacks the requisite strength as a whole to be engaged by a single tension imposing means contributing the total back tension effect required by the singles balloons. The material receives a first twist in the zone of travel C, thereupon entering the twisting guide 490 at the top of the spindle. After thus being first twisted, the material is stronger as a whole and may receive a second, larger, back tension, before it enters the singles balloon. In the embodiment shown, such additional tension is effected by means of the tension means 500 mounted on the arm 496 of the double-armed flyer designated generally 494. The other, balancing, arm of the flyer is designated 498, there being mounted on the outer end of such arm a non-operative, balancing means 502, so that the flyer is in dynamic balance.

As shown in FIG. 20, there is screwed into the internally threaded arm 496 of the flyer the left-hand end 504 of the adjustable sleeve 502. Such sleeve is firmly held in arm 496 by means of the two lock nuts 506 and 508. On the outer end of sleeve 502 there is threaded the tension device 500, the externally threaded end 510 of the sleeve being received in a threaded recess in means 500. The parts 510 and 500 are firmly held together by means of the lock nuts 512 and 514. To facilitate mounting and dismounting of the tension device and the sleeve on the arm, the threads 510 and 504, respectively, may be made right and left hand threads, the sleeve being conveniently turned by means of the hexagonal shaped unthreaded portion 516.

The tension device 500 incorporates therewithin the helical thread guiding tube 518, the tube having a sufficient number of helices therein, and the helices being of such pitch and length of travel, that tension device 500 under operating conditions imparts to the single twisted thread 492 entering it and passing through it into the balloon 54' a tension which, in addition to the tension imposed by the primary tension means 488, equals the back tension necessary to balance the balloon 54'. The thread 492 travelling through the tube 518 is, of course, subjected to bending in travelling through the helices of the tube, and is also subjected to centrifugal force which throws it strongly into engagement with the wall of the tube at the left in FIG. 20. The particular configuration of the tube 518 required for any twisting operation can readily be arrived at, and it is convenient to provide a series of tension means 500 having tension imposing effects in steps of, say, fifty grams. The gaps between such tension devices may therefore be readily filled by adjustment of the ball tension means 488.

Tension means 500 may conveniently by made by first providing a tube 518 of suitable hard smooth wear-resistant metal, bending it into the desired configuration, and then mounting it in a mold as an insert, after which the metal forming the main body 520 of device 500 may be cast about it.

It can be seen, therefore, that the flyer 494 with the replaceable tension means 500 thereon can, in conjunction with the adjustable eye 56', provide a singles balloon having the requisite weight of material in it and the required speed of travel about its axis, so that the sum of the tensions in the two singles balloons 46' and 54' will equal the tension in the take-up balloon 84' at its medial diameter.

In the various embodiments of the apparatus of the invention above described, those of FIGS. 4 and 6 have, as stated, means whereby both the pressure of the air column or jet and the speed of the air vortex accompanying the balloon may be read directly. The apparatus of FIG. 11 incorporates means whereby the diameter of the balloon may be read directly. In others of the described embodiments, that is, that of FIGS. 1, 2, 3, and 5, that of FIG. 7, that of FIG. 8, and that of FIGS. 18 and 19 and 20, no means is provided whereby either the speed or pressure of the air jet, air collumns, or air vortex may be read. The balloon control apparatus of such embodiments, however, embody means for detecting one or more of such phenomena and means for transmitting the observed phenomenon to a balloon controlling means. Accordingly, all the described embodiments of the invention except that of FIGS. 11–15, inclusive, either "measure" the speed of an air column, "measure" the pressure in such air column, or both. It is also to be understood that in the embodiments of FIGS. 4 and 6, should it not be desired to read directly the pressure in the air column or the speed of the air vortex, the hot wire of the anemometer and the output from the photoelectric cell, respectively, of such embodiments may be connected directly to a suitable amplifier which, in turn, leads to the variable braking or tension imposing means.

In the embodiment of the apparatus shown in FIGS. 21, 22, and 23 there is employed a self-adjusting eye at the spindle, the balloon of which is to be controlled. The eye adjusting mechanism is powered by frictional contact with the elongated flexible material passing therethrough, the eye being caused to descend when the balloon expands unduly, and to rise when the balloon contracts unduly, whereby the balloon seeks the condition wherein its diameter is the predetermined optimum diameter termed the "medial diameter." The eye adjusting means of this embodiment can be used with (1) the mechanism of FIGS. 18, 19, and 20, replacing the air and electrically operated means for controlling the height of the cabling spindle balloon eye, (2) a three-spindle system wherein the gathering pulley is provided with a fixed brake, the device of this invention automatically governing the height of the cabling spindle eye in such system, and (3) the three-spindle mechanism set out in (2) above modified by the employment of a separate braking mechanism for each singles strand, the gathering pulley being idle and unbraked, the device of this embodiment of the present invention being employed as in (2) above.

The eye adjusting means of the embodiment of FIGS. 21 and 22 will allow the necessary minor compensation in size and thus in tension of the take-up balloon to maintain it under control without requiring other adjustments of tension, as in the singles or elsewhere in the system. In other words, the slight variations in tension arising from adjustment of take-up balloon size to maintain it under control will not upset the overall general balance existing in the system.

The material 530 being twisted enters balloon 532 through eye 534. Such eye is rotatably mounted on platform 536. The amount of torque exerted on eye 534 varies as the diameter of balloon 532, since material 530 frictionally engages the bore therethrough, being pressed into engagement with such bore by the centrifugal force of the balloon. Such centrifugal force, in turn, depends on the weight and speed (diameter of the balloon) of the material in the balloon. Eye 534 carries on its bottom end the gear 537 which, through gears 538, rotatable on axes fixed with respect to the platform, drives ring gear 540 rotatably mounted in platform 536. Gear 540 drives the worm-driving gears 542 through the medium of gears 544 and 546. Vertical parallel worms 548, journalled in the machine frame as shown, pass snugly but freely through the bores in gears 542, the gears being keyed to the worms by keys 550 on the gear hubs. The worms are threadedly received in nuts 552 integral with the main body of platform 536.

Thus rotation of eye 534 by the material 530 will tend to turn the worms 548, causing platform 536 and eye 534 to travel vertically. The worms 548 are chosen of such hand that eye 534 when contacted by material 530 tends to drive the platform 536 downwardly. Rotation of worms 548 in the direction to carry platform 536 downwardly is resisted by a spring torque motor 554, which may be wound to varying degrees of tightness by key 556. Motor 554 is geared to worms 548 by means of gear 558 on the motor meshing with gears 560 keyed to the upper parts of the worms 548.

It will be apparent that, when the balloon 532 is at its medial diameter and when spring torque motor 554 is wound to a predetermined degree, the platform 536 will seek a predetermined level at which the torque imposed upon worms 548 by the eye 534 balances the opposite torque imposed upon the worms by torque motor 554. Should the balloon 532 expand substantially, the friction between material 530 and eye 534 will increase. Thus worms 548 will be rotated to lower platform 536 to a point where the two torques acting upon worms 548 balance. The reverse action takes place when the balloon 532 contracts substantially. Thus the eye adjusting device is stable in operation, tending constantly to maintain eye 534 at, or to restore it to, the height at which the tension in balloon 532 is of the desired predetermined value and the balloon 532 is of medial diameter.

Although the apparatus and method of the invention have been described above in connection with the various detecting methods and apparatus as measuring the diameter of the balloon of the twisting spindle, and as controlling the balloon diameter in accordance with such measurement, it will be apparent that in the practice of the invention the measurement of the balloon diameter, with various known spindle components, will also give a measurement of the length of the elongated flexible material in the balloon. Thus, with a known constant spindle speed, a known flyer radius, a given speed of travel of the material through the spindle, a given height of the guiding eye above the spindle, and a giver flyer and yarn passage configuration therein, when a given elongated flexible material of substantially uniform properties longitudinally thereof is twisted in the spindle, the balloon diameter and the length of the material in the balloon bear a determinable, fixed relationship to each other. Such relationship may readily be determined, with a given material and with the various spindle component factors constant, by taking ultra-high speed pictures of the spindle in operation, a succession of pictures being taken at a succession of balloon diameters differing from each other by small increments. The length of the material in the balloon corresponding to each balloon size may then readily be measured from the pictures, and a graph of such values made up. The before described measurements of the balloon whereby it may be controlled are thus also measurements of the length of the material in the balloon, as well as of the balloon diameter.

It will be apparent that in the above described methods and apparatus the balloon whose diameter, and thus the length of material therein, is being controlled has such factors thereof held within desired limits by the alteration of the relative speeds at which the material feeds into the balloon and at which it is removed from the balloon, such alteration being effected in response to continuous measurement of one or more such factors of the balloon. In the described preferred embodiments of the system the speed of removal of material from the balloon is essentially constant, being carried out by the auxiliary capstan at the cabling and take-up twisting spindle, such capstan being driven by and in synchronism with the main shaft of such spindle, such main shaft being driven at a constant speed. Various embodiments of the described apparatus and method vary the speed of entry of the material into the balloon by imposing varying retarding tension on the infeeding material, either at the gathering pulley or by varying the tension in the singles balloons. Other embodiments, those varying the height of the cabling balloon, vary the tension in the cabling balloon relative to the sum of the tensions of the singles balloon, and thus vary the rate of feed of the material into the cabling balloon.

It will be seen that the central spindle in each of embodiments 1, 2, 3, 4, 6, and 7, and the single spindle of embodiment 5 is of the downtwister or infeeding type, that is, the strand first enters the balloon through an apex guiding eye, and the strand leaves the balloon by way of the balloon-generating flyer along which it travels generally radially inwardly toward the axis of the balloon. It will also be seen that in each of such spindles the balloon is held "tight," that is, the only resiliently or yieldably held run of the strand between and including the means outwardly of the apex guide for feeding and/or guiding the strand into the balloon and the means for feeding the strand out of the balloon is the balloon itself.

The strand in the balloon of all such embodiments, of course, is held under yielding tension by the centrifugal force to which it is subjected. The variable speed means 206 in FIG. 1 for feeding the strand 128 into the balloon 84, and the constant speed means 196 for feeding it out of the balloon are unyieldingly located at fixed distances from the respective ends of the balloon. In FIGS. 18 and 19 the idle strand guide means 204' and the constant speed strand take-up capstan within the balloon are unyieldingly located at fixed distances from the respective ends of the balloon. In the system of embodiment (7), FIGS. 20–23, inclusive, the self-adjusting torque-responsive eye and its operating mechanism are substituted for eye 82' and its operating mechanism in the system of FIGS. 18 and 19, the strand guiding means 204' and the constant speed strand take-up capstan remaining as in FIGS. 18 and 19.

As a result of such construction of the infeeding spindles in question, there are no variables in the run of the material or strand containing the balloon, other than the balloon itself.

The means for detecting changes in the diameter of the balloon in each of embodiments 1, 2, 5, 6, and 7 detects a force generated by the balloon by interaction with the strand in the run thereof from and including the zone of the strand at the means feeding and/or guiding the strand into the balloon and the zone of the strand at the means feeding the strand out of the balloon. In embodiments 1, 2, 5, and 6, an air-receiving means surrounding the balloon at one annular zone thereof cooperates with the air vortex set up by the rotating strand of the balloon, the pressure of the air thus received serving as a measure of the force generated by the balloon, and thus also serving as a measure of the diameter of the balloon. In embodiment 7 the interaction with the strand is that of frictional engagement between the strand and a rotatable friction surface disposed between and including the ends of the balloon, the torque between the strand and the friction surface serving as a measure of the force generated by the balloon, and thus also serving as a measure of the diameter of the balloon.

The interaction between the strand and the balloon measuring device of each of embodiments 1–7, inclusive, is such that the measuring of balloon diameter, and changes in balloon diameter, does not of itself alter the diameter of the balloon or introduce any variables into the system. Further, the use of the response of the balloon measuring device to control the diameter of the balloon does not itself entail the alteration of the diameter of the balloon. Neither of these facts is true of those prior art devices wherein a spring held salient loop of the strand was maintained either in advance of the balloon or at the exit end of the balloon, and variations in the length of the loop were employed to control the variable speed strand feeding means located nearer the spring held salient loop. In both of such prior devices the very acts of determining the diameter of the balloon and of using the response of the spring held loop to control the variable speed feeding means required a change in the length of such loop and thus a change in the diameter of the balloon. Thus such prior devices were incapable of measuring the diameter of the balloon per se, and were unable accurately to maintain the diameter of the balloon within predetermined limits.

In embodiments 1, 3, 4, 5, and 6, the strand is fed into the balloon by a controlled variable speed means, and is taken up by a constant speed means. The variable speed means is under the control of the above-discussed balloon diameter measuring means. In embodiments 1, 3, and 4, the variable speed means is a braked capstan about which the strand runs in substantially non-slipping engagement therewith, the balloon diameter measuring means controlling the degree of braking of such feeding means.

In embodiment 7, the friction surface is the bore of eye 534 positioned at the entrance end of the balloon 532. The torque on the bore of member 534 governs the height of the balloon and thus the tension of the material therein, as above explained.

As above pointed out, in all the embodiments shown the balloon itself is the only resiliently or yieldably maintained zone between and including the means mounted at a fixed distance from the flyer for feeding the material out of the balloon and the guiding means above the apex guide of the balloon. In embodiments 1, 3, and 4, such guiding means is, of course, a material speed-controlling feeding means in the form of a controllable variably retarded capstan mounted at a fixed distance from the flyer. The only factor, therefore, which significantly affects the length of the material between the entering, guiding, and/or feeding means and the feeding means at the exit end of the balloon is the size of the balloon itself.

Whereas, for purposes of illustration I have shown and described preferred embodiments of the method of and apparatus for measuring the diameter of rapidly rotating objects such as the balloons of twisting spindles, and I have also described and illustrated preferred embodiments of the method of and apparatus for controlling the diameter of such balloons, it is to be understood that such embodiments are illustrative only, and that the invention is capable of considerable variation as to details. The invention is, therefore, to be defined by the scope of the claims appended hereto.

I claim:

1. Apparatus for controlling the balloon of an elongated flexible material twisting spindle of the infeeding type which creates and receives material from a balloon in free flight through the air, comprising a flyer, a first means for continuously feeding material into the balloon, a second means for continuously feeding the material to withdraw it from the balloon and thence radially inwardly through the flyer, the material in the run thereof from and including the portions thereof engaged by the first and second feeding means being held under tension with the balloon as the only yieldably maintained salient zone between such two means and the balloon as the only significant variable factor which affects the length of the strand extending between the zone of its introduction into the balloon and the zone of the second feeding means, one of said first and second feeding means feeding the strand at substantially constant speed and the other of said first and second feeding means feeding the strand at a variable speed, the first and second feeding means being disposed at fixed distances from the flyer, and means for detecting changes in the diameter of the balloon and for varying the strand forwarding speed of the means for feeding the material at variable speed to vary the diameter of the balloon in response to such detected changes to maintain such diameter within a predetermined range, said last named means including means cooperative with a zone of the strand between and including the zone of the material engaged by the first feeding means and the zone of the material engaged by the second feeding means to detect a force which is generated by the balloon and which varies in a predetermined relationship with changes in diameter of the balloon.

2. Apparatus as defined in claim 1, wherein the first and second feeding means include rotatable capstans mounted on fixed axes, said capstans having frictional engagement with the material traveling therepast.

3. A spindle for twisting elongated flexible material having substantially constant properties longitudinally thereof, said spindle having a flyer, means for rotating the flyer at constant speed, a balloon guiding means spaced from the flyer, and means for controlling the balloon to maintain it of substantially constant diameter, said last named means comprising means at the spindle for detecting changes in a force which is generated by and directly attendant upon the balloon and which changes to a substantial degree solely as a result of changes in balloon diameter, the changes in such force having a known predetermined relationship with the changes in the diameter of the balloon, and means operative in response to the last named means to vary the tension of the material in the balloon.

4. A spindle for twisting elongated flexible material, said spindle having a flyer, means for rotating the flyer at constant speed, a balloon guiding means spaced from the flyer, and means for controlling the balloon to maintain it of substantially constant diameter, said last named means comprising means at the spindle for detecting changes in a force which is generated by and directly attendant upon the balloon and which changes to a substantial degree solely as a result of changes in balloon diameter, the changes in such force having a known predetermined relationship with the changes in the diameter of the balloon, and means operative in response to the last named means to vary the tension of the material in the balloon.

5. A spindle for twisting elongated flexible material, said spindle having balloon forming means, means for rotating the balloon forming means at constant speed, a balloon apex guiding means spaced from the balloon forming means, and means for controlling the balloon to maintain it of substantially constant diameter, said last named means comprising means at the spindle for detecting changes in a force which is generated by and directly attendant upon the balloon and which changes to a substantial degree solely as a result of changes in balloon diameter, the changes in such force having a known predetermined relationship with the changes in the diameter of the balloon, and means operative in response to the last named means to vary the tension of the material in the balloon.

6. An infeeding spindle for twisting elongated flexible material having substantially constant properties longitudinally thereof, said spindle having a flyer, means for rotating the flyer at constant speed, a balloon guiding means spaced from the flyer, the material being continuously fed into the balloon in a first run generally axially of the balloon through said balloon guiding means and out of the balloon and thence generally radially inwardly through the flyer into a second run generally axially of the balloon, the material in the portion thereof from and including the first generally axial run, the balloon, and the second generally axial run thereof being held under tension with the balloon as the only resiliently maintained salient zone in such portion, and means for controlling the balloon to maintain it of substantially constant diameter, said last named means comprising means at the spindle for detecting changes in a force which is generated by and directly attendant upon the balloon and which changes to a substantial degree solely as a result of changes in balloon diameter, the changes in such force having a known predetermined relationship with the changes in the diameter of the balloon, and means operative in response to the last named means to vary the tension of the material in the balloon.

7. An infeeding spindle for twisting elongated flexible material, said spindle having a flyer, means for rotating the flyer at constant speed, a balloon guiding means spaced from the flyer, the material being continuously fed into the balloon in a first run generally axially of the balloon through said balloon guiding means and out of the balloon and thence generally radially inwardly through the flyer into a second run generally axially of the balloon, the material in the portion thereof from and including the first generally axial run, the balloon, and the second generally axial run thereof being held under tension with the balloon as the only resiliently maintained salient zone in such portion, and means for controlling the balloon to maintain it of substantially constant diameter, said last named means comprising means at the spindle for detecting changes in a force which is generated by and directly attendant upon the balloon and which changes to a substantial degree solely as a result of changes in balloon diameter, the changes in such force having a known predetermined relationship with the changes in the diameter of the balloon, and means operative in response to the last named means to vary the tension of the material in the balloon.

8. An infeeding spindle for twisting elongated flexible material, said spindle having balloon forming means, means for rotating the balloon forming means at constant speed, a balloon apex guiding means spaced from the balloon forming means, the material being continuously fed into the balloon in a first run generally axially of the balloon through said balloon guiding means and out of the balloon and thence generally radially inwardly through the flyer into a second run generally axially of the balloon, the material in the portion thereof from and including the first generally axial run, the balloon, and the second generally axial run thereof being held under tension with the balloon as the only resiliently maintained salient zone in such portion, and means for controlling the balloon to maintain it of substantially constant diameter, said last named means comprising means at the spindle for detecting changes in a force which is generated by and directly attendant upon the balloon and which changes to a substantial degree solely as a result of changes in balloon diameter, the changes in such force having a known predetermined relationship with the changes in the diameter of the balloon, and means operative in response to the last named means to vary the tension of the material in the balloon.

9. An infeeding spindle for twisting elongated flexible material having substantially constant properties along the length thereof, said spindle having a flyer, means for rotating the flyer at constant speed, a balloon guiding means spaced from the flyer to define a balloon of generally constant height, the material travelling in that order through the balloon guiding means, the balloon, and radially inwardly of the flyer, and means for controlling the balloon to maintain it of substantially constant diameter, said last named means comprising means at the spindle for detecting changes in a phenomenon which is directly attendant upon the balloon and which changes to a substantial degree solely as a result of changes in balloon diameter, the changes in such phenomenon having a known predetermined relationship with the changes in the diameter of the balloon, and means operative in response to the last named means to vary the tension of the material in the balloon.

10. An infeeding spindle for twisting elongated flexible material having substantially constant properties along the length thereof, said spindle having a flyer, means for rotating the flyer at constant speed, a balloon guiding means spaced from the flyer to define a balloon of generally constant height, means for withdrawing the material from the balloon after the material has travelled radially inwardly of the flyer, the material travelling in that order through the balloon guiding means, the balloon, and radially inwardly of the flyer, the material in the portion thereof from and including the balloon guiding means, the balloon, the run of the material radially inwardly of the flyer, and to and including the means for withdrawing the material from the balloon being held under tension with the balloon as the only resiliently maintained salient zone in such portion, and means for controlling the balloon to maintain it of substantially constant diameter, said last named means comprising means at the spindle responsive substantially solely to changes in diameter of the balloon, and means operative in response to the last named means to vary the tension of the material in the balloon.

11. An infeeding spindle for twisting elongated flexible material having substantially constant properties along the length thereof, said spindle having a flyer, means for rotating the flyer at constant speed, a balloon guiding means spaced from the flyer to define a balloon of generally constant height, the material travelling in that order through the balloon guiding means, the balloon, and radially inwardly of the flyer, and means for controlling the balloon to maintain it of substantially constant diameter, said last named means comprising means at the spindle for detecting changes in a phenomenon which is directly attendant upon the balloon and which changes to a substantial degree solely as a result of changes in balloon diameter, the changes in such phenomenon having a known predetermined relationship with the changes in the diameter of the balloon, a first feeding means at the entering end of the balloon for feeding the material into the balloon, a second feeding means at the exit end of the balloon for withdrawing the material from the balloon, one of said last two means feeding the material at substantially constant speed and the other such means feeding the material at a variable speed, and means responsive to the means for detecting changes in such phenomenon to vary the speed of feeding of the variable speed feeding means.

12. An infeeding spindle for twisting elongated flexible material, said spindle having a flyer, means for rotating the flyer at constant speed, a balloon guiding means spaced from the flyer to define a balloon of generally constant height, the material travelling in that order through the balloon guiding means, the balloon, and radially inwardly of the flyer, and means for controlling the balloon to maintain it of substantially constant diameter, said last named means comprising means at the spindle for detecting changes in a phenomenon which is directly attendant upon the balloon and which changes to a substantial degree solely as a result of changes in balloon diameter, the changes in such phenomenon having a known predetermined relationship with the changes in the diameter of the balloon, and means operative in response to the last named means to vary the tension of the material in the balloon.

13. An infeeding spindle for twisting elongated flexible material having substantially constant properties along the length thereof, said spindle having a flyer, means for rotating the flyer at constant speed, a balloon guiding means spaced from the flyer to define a balloon of generally constant height, the material travelling in that order through the balloon guiding means, the balloon, and radially inwardly of the flyer, and means for controlling the balloon to maintain it of substantially constant diameter, said last named means comprising means at the spindle for continuously measuring changes in a phenomenon which is directly attendant upon the balloon and which changes to a substantial degree solely as a result of changes in balloon diameter, the changes in such phenomenon having a known predetermined relationship with the changes in diameter of the balloon, and means operative in response to said phenomenon measuring means to vary the tension of the material in the balloon.

14. Apparatus for handling elongated flexible material advancing under tension through a zone in which it forms a rotating balloon, comprising means including a flyer for rotating the balloon, a balloon guiding means spaced from the last named means and located on the axis of rotation of such means, the material travelling in that order through the balloon guiding means, the balloon, and radially inwardly of the flyer, and means for controlling the size of the balloon comprising means for detecting changes in a phenomenon which is directly attendant upon the balloon and which changes to a substantial degree previously as a result of changes in balloon diameter, the changes in such phenomenon having a known predetermined relationship with the changes in diameter of the balloon, and means controlled by the last named means for controlling the size of the balloon.

15. Apparatus for controlling the balloon of an elongated flexible material twisting spindle which creates and receives material from a balloon in free flight through the air comprising a flyer, means for continuously feeding material into the balloon, means for continuously withdrawing material from the balloon and thence in through the flyer, the material in the run thereof from and including the zone at the means for feeding the material into the balloon and the zone of the means for withdrawing the material from the balloon being held under tension with the balloon as the only resiliently maintained salient zone between such two feeding zones, and means for detecting changes in the diameter of the ballon and for varying the speeds of feeding of the material into and out of the balloon relative to each other, whereby to maintain the balloon diameter within predetermined desired limits, said last named means coacting with the material at a zone located between and including the said two zones of feeding of the material.

16. Apparatus as set forth in claim 15, wherein the means for withdrawing material from the balloon includes a rotatable driven capstan about which the material is coiled and with the surface of which the material has material-forwarding frictional engagement.

17. Apparatus as set forth in claim 16, wherein the means for detecting changes in the diameter of the balloon comprises means responsive to a force generated by the balloon, said force having a predetermined relationship to the diameter of the balloon.

18. Apparatus for controlling the balloon of an elongated flexible material twisting spindle which creates and receives material from a balloon in free flight through the air comprising a flyer, means for continuously feeding material into the balloon, means for continuously withdrawing material from the balloon and thence in through the flyer, one of said material feeding means feeding the material at an essentially constant speed, and the other of said material feeding means feeding the material at a variable speed, the material in the run thereof from and including the zone at the means for feeding the material into the balloon and the zone of the means for withdrawing the material from the balloon being held under tension with the balloon as the only resiliently maintained salient zone between such two feeding zones, said apparatus including means for detecting changes in the diameter of the balloon and for controlling the means for feeding the material at variable speed whereby to maintain the balloon diameter within predetermined desired limits.

19. Apparatus as set forth in claim 18, wherein the means for withdrawing material from the balloon includes a rotatable driven capstan about which the material is coiled and with the surface of which the material has material-forwarding frictional engagement.

20. A method of twisting elongated flexible material, comprising rotating a zone of the material in the form of a balloon, feeding the material into the balloon at a first zone in advance of the balloon, taking up the material after it has passed through the balloon at a second zone beyond the balloon, the feeding at said first zone and the taking up at the second zone controlling the speed at which the material is fed at such respective zones, the feeding at one of said feeding zones being at a substantially constant speed and the feeding at the other of said feeding zones being at a controlled variable speed, holding the material so that the balloon is the only yieldably maintained zone between the first and second feeding zones, detecting changes in a total force which includes as at least a substantial component thereof a force generated by the balloon, the component and the total force varying in the same direction as and bearing a substantially predetermined relationship to the size of the balloon, the detection of changes in said total force and thus in the size of the balloon being such as not to change the size of the balloon, and varying the feeding of the material at said zone of variable feeding thereof in accordance with the detected force so as to maintain the diameter of the balloon within predetermined limits.

21. The method of controlling the balloon of an elongated flexible material twisting spindle which creates and receives material from a balloon driven in free flight through the air by a driven rotatable flyer, which comprises continuously feeding material into the balloon, continuously withdrawing material from the balloon and thence in through the flyer, holding the material in the run thereof from and including the zone of feeding of the material into the balloon and the zone of withdrawing of the material under tension with the balloon as the only resiliently maintained salient zone between such two feeding zones, detecting variations in a force generated by said balloon, said force having a predetermined relationship to the diameter of the balloon, and controlling the diameter of the balloon in accordance with variations in said detected force.

22. The method of controlling the balloon of an elongated flexible material twisting spindle which creates and receives material from a balloon driven in free flight through the air by a driven rotatable flyer, which comprises continuously feeding material into the balloon, continuously withdrawing material from the balloon and thence in through the flyer, holding the material in the run thereof from and including the zone of feeding of the material into the balloon and the zone of withdrawing of the material under tension with the balloon as the only resiliently maintained salient zone between such two feeding zones, maintaining the zones of feeding of the material into and out of the balloon at fixed distances from the respective ends of the balloon, detecting variations in a force generated by said balloon, said force having a predetermined relationship to the diameter of the balloon, and controlling the diameter of the balloon in accordance with said detected force.

23. A method of twisting elongated flexible material, comprising rotating by a flyer a zone of the material in the form of a balloon, said balloon having an apex at the end thereof remote from the flyer, feeding the material into the apex end of the balloon at a first zone in advance of the balloon, feeding the material after it has passed through the balloon and radially inwardly of the flyer at a second zone beyond the balloon, the feeding at said first and second feeding zones controlling the speeds at which the material passes through said zones, respectively, the feeding at said feeding zones being variable with respect to each other, holding the material so that the balloon is the only yieldably maintained zone between the first and second feeding zones, detecting changes in a total force which includes as at least a substantial component thereof a force generated by the balloon, the component and the total force varying in the same direction as the size of the balloon, the detection of changes in said total force and thus in the size of the balloon being such as not to change the size of the balloon, and varying the relative rates of feeding of the material at said feeding zones in accordance with the detected force so as to maintain the diameter of the balloon within predetermined limits.

24. A method of twisting elongated flexible material, comprising rotating by a flyer a zone of the material in the form of a balloon, said balloon having an apex at the end thereof remote from the flyer, feeding the material into the apex of the balloon at a first zone in advance of the balloon, feeding the material after it has passed through the balloon and radially inwardly of the flyer at a second zone beyond the balloon, the feeding at said first and second feeding zones controlling the speeds at which the material passes through such zones, respectively, the feeding at one of said feeding zones being at a substantially constant speed and such feeding at the other of said feeding zones being at variable speed, holding the material so that the balloon is the only yieldably maintained zone between the first and second feeding zones, detecting changes in a total force which includes as at least a substantial component thereof a force generated by the balloon, the component and the total force varying in the same direction as the size of the balloon, the direction of changes in said total force and thus in the size of the balloon being such as not to change the size of the balloon, and varying the feeding of the material at said zone of variable feeding thereof in accordance with and by the detected force so as to maintain the diameter of the balloon within predetermined limits.

25. A method of twisting elongated flexible material, comprising rotating by a flyer a zone of the material in the form of a balloon, said balloon having an apex at the end thereof remote from the flyer, feeding the material into the balloon at a first zone in advance of the balloon, feeding the material after it has passed through the balloon and radially inwardly of the flyer at a second zone beyond the balloon, the feeding at said first and second feeding zones controlling the speeds at which the material passes through such zones, respectively, the feeding at one of said feeding zones being at a substantially constant speed and such feeding at the other of said feeding zones being at variable speed, holding the material so that the balloon is the only yieldably maintained zone between the first and second feeding zones, detecting changes in a total force which includes as at least a substantial component thereof a force generated by the balloon, the component and the total force varying in the same direction as the size of the balloon, the detection of changes in said total force and thus in the size of the balloon being such as not to change the size of the balloon, and varying the feeding of the material at said zone of variable feeding thereof in accordance with and by the detected force so as to maintain the diameter of the balloon within predetermined limits, the application per se of the detected force to vary said feeding of the material being such as not to change the size of the balloon.

26. The method of controlling the balloon of an elongated flexible material twisting spindle of the infeeding type which creates and receives material from a balloon driven in free flight through the air by a driven rotatable flyer, said balloon having an apex at the end thereof remote from the flyer, which comprises continuously feeding material into the apex of the balloon, continuously feeding material after it has passed through the balloon and thence in through the flyer, holding the material in the run thereof from and including the zones of feeding of the material under tension with the balloon as the only resiliently maintained salient zone between such two feeding zones, maintaining the zones of feeding of the material at fixed distances from the respective ends of the balloon, detecting variations in a force generated by said balloon, said force varying in the same direction as the diameter of the balloon, and controlling the diameter of the balloon in accordance with said detected force.

27. Apparatus for controlling the balloon of an elongated flexible material twisting spindle of the infeeding type provided with a driven rotatable flyer which creates and receives material from a balloon in free flight through the air, comprising means for feeding material into the apex end of the balloon, means located at a fixed distance from the flyer for continuously withdrawing material which has passed through the balloon and thence in through the flyer, one of said feeding means feeding the material at an essentially constant rate, the other of said feeding means feeding the material at a variable rate, the material in the run thereof from and including the zone of feeding of the material into the balloon and the zone of withdrawing of the material being held under tension with the balloon as the only resiliently maintained salient zone between such two feeding zones, means for detecting changes in a force generated by the balloon, said force varying with variations in diameter of the balloon, and means responsive to the last named means for controlling the variable speed feeding means whereby to maintain the balloon diameter within predetermined limits.

28. Apparatus for controlling the balloon of an elongated flexible material twisting spindle of the infeeding type which creates and receives material from a balloon in free flight through the air comprising a flyer, means for continuously feeding material into the balloon, means for continuously feeding the material to withdraw it from the balloon and thence in through the flyer, the material in the run thereof from and including the zone of feeding of the material into the balloon and the zone of withdrawing of the material from the balloon being held under tension with the balloon as the only resiliently maintained salient zone between such two feeding zones, means for detecting changes in a force generated by the balloon, said force varying with variations in diameter of the balloon, and means responsive to the last named means operative to vary the relative speeds of feeding of the material into and out of the balloon to maintain the diameter of the balloon within predetermined limits.

29. A spindle of the infeeding type for twisting elongated flexible material, said spindle having a flyer, means for rotating the flyer at constant speed, a balloon guiding means spaced from the flyer to define a balloon of generally constant height, means to feed the material into the balloon, means to feed the material out of the balloon and thence inwardly through the flyer, and means for controlling the balloon to maintain it of substantially constant diameter, said last named means comprising means at the spindle for continuously measuring the diameter of the balloon of such material, and means operative in response to said balloon diameter measuring means to vary the tension of the material in the balloon.

30. A spindle of the infeeding type for twisting elongated flexible material having substantially constant properties along the length thereof, said spindle having a flyer, means for rotating the flyer at constant speed, a balloon guiding means spaced from the flyer to define a balloon of generally constant height, means to feed the material into the balloon, means to feed the material out of the balloon and thence inwardly of the flyer, and means for controlling the balloon to maintain it of substantially constant diameter, said last named means comprising means at the spindle for continuously measuring the diameter of the balloon of such material, and means operative in response to said balloon diameter measuring means to vary the tension of the material in the balloon.

31. Apparatus for controlling the balloon of elongated flexible material at a spindle, the balloon flying freely through the air and creating an air vortex, comprising means for detecting changes in the air vortex accompanying changes in the diameter of the balloon, and means responsive to the last named means operative to vary the tension of the material in the balloon.

32. Apparatus for controlling the balloon of elongated flexible material at a spindle, the balloon flying freely through the air and creating an air vortex, comprising means for detecting changes in the air vortex accompanying changes in the diameter of the balloon, a first feeding means at the entering end of the balloon for feeding the material into the balloon, a second feeding means at the exit end of the balloon for withdrawing the material from the balloon, one of said last two means feeding the material at substantially constant speed and other such means feeding the material at a variable speed, and means responsive to the means for detecting changes in the air vortex to vary the speed of feeding of the variable speed feeding means.

33. Apparatus for controlling the balloon of elongated flexible material being twisted at a spindle, the balloon flying freely through the air and creating an air vortex, comprising a first means for continuously feeding material into the balloon, a second means for continuously withdrawing material from the balloon, means for detecting changes in the air vortex accompanying changes in diameter of the balloon, and means responsive to the last named means operative to vary the relative speeds of the first and second material feeding means.

34. Apparatus for controlling the balloon of an elongated flexible material spindle, the balloon flying freely through the air and creating an air vortex, comprising means for measuring changes in the speed of the air vortex, and means for varying the tension of the material in the balloon in response to the last named means.

35. Apparatus for maintaining of substantially constant diameter the balloon of an elongated flexible material twisting spindle, the ballon flying freely through the air and creating an air vortex, comprising means defining a column of air in direct communication with the air vortex, means for measuring changes in pressure in such column, and means for varying the tension of the material in the balloon in response to the last named means.

36. Apparatus for controlling the balloon of elongated flexible material at a spindle, the balloon flying freely through the air and creating an air vortex, comprising means for detecting changes in the speed of the air vortex accompanying changes in diameter of the balloon, and means responsive to the last named means operative to vary the tension of the material in the balloon.

37. Apparatus for controlling the balloon of elongated flexible material being twisted at a spindle, the balloon flying freely through the air and creating an air vortex, comprising a first means for continuously feeding material into the balloon, a second means for continuously withdrawing material from the balloon, means for detecting changes in the speed of the air vortex accompanying changes in diameter of the balloon, and means responsive to the last named means operative to vary the relative speeds of the first and second material feeding means.

38. Apparatus for controlling the balloon of elongated flexible material at a spindle, the balloon flying freely through the air and creating an air vortex, comprising means for detecting changes accompanying changes in diameter of the balloon, in the pressure of the air in the air vortex at a predetermined distance from the axis of the balloon, and means responsive to the last named means operative to vary the tension of the material in the balloon.

39. Apparatus for controlling the balloon of elongated flexible material being twisted at a spindle, the balloon flying freely through the air and creating an air vortex, comprising a first means for continuously feeding material into the balloon, a second means for continuously withdrawing material from the balloon, means for detecting changes, accompanying changes in diameter of the balloon, in the pressure of the air in the air vortex at a predetermined distance from the axis of the balloon, and means responsive to the last named means operative to vary the relative speeds of the first and second material feeding means.

40. Apparatus for controlling the balloon of elongated flexible material at a spindle, the balloon flying freely through the air and creating an air vortex, comprising means defining a column of air in direct communication with the air vortex set up by the balloon, means for detecting changes in pressure in the air in the column, and means responsive to the last named means operative to vary the tension of the material in the balloon.

41. Apparatus for controlling the balloon of elongated flexible material at a spindle, the balloon flying freely through the air and creating an air vortex, comprising means defining a confined path of egress of air in direct communication with the air vortex, means for detecting changes in the speed of the air in such path of egress, and means responsive to the last named means operative to vary the tension of the material in the balloon.

42. Apparatus for maintaining of substantially constant diameter the balloon of elongated flexible material at a spindle, the spindle having a balloon creating flyer and a guiding means spaced therefrom and located on the axis of the spindle, the balloon flying freely through the air, creating an air vortex, and being generally of a constant height, comprising means for detecting changes in the air vortex accompanying changes in diameter of the balloon, and means responsive to the last named means operative to vary the tension of the material in the balloon.

43. Apparatus for maintaining of substantially constant diameter the balloon of elongated flexible material at a spindle, the spindle having a balloon creating flyer and a guiding means spaced therefrom and located on the axis of the spindle, the balloon flying freely through the air, creating an air vortex, and being generally of a constant height, comprising a first means for continuously feeding material into the balloon, a second means for continuously withdrawing material from the balloon, means for detecting changes in the air vortex accompanying changes in diameter of the balloon, and means responsive to the last named means operative to vary the relative speeds of the first and second material feeding means.

44. Apparatus for maintaining of substantially constant diameter the balloon of elongated flexible material at a spindle, the spindle having a balloon creating flyer and a guiding means spaced therefrom and located on the axis of the spindle, the balloon flying freely through the air, creating an air vortex, and being generally of a constant height, comprising means for detecting changes in the speed of the air vortex accompanying changes in diameter of the balloon, and means responsive to the last named means operative to vary the tension of the material in the balloon.

45. Apparatus for maintaining of substantially constant diameter the balloon of elongated flexible material at a spindle, the spindle having a balloon creating flyer and a guiding means spaced therefrom and located on the axis of the spindle, the balloon flying freely through the air, creating an air vortex, and being generally of a constant height, comprising means defining a column of air in direct communication with the air vortex, the inner end of the means defining such air column being an annular guard positioned about the spindle coaxial therewith and having at least one passage therein for the escape of air from the vortex, an air pressure detecting means connected to the passage, and means responsive to the last named means operative to vary the tension of the material in the balloon.

46. Apparatus for maintaining of substantially constant diameter the balloon of elongated flexible material at a spindle, the spindle having a balloon creating flyer and a guiding means spaced therefrom and located on the axis of the spindle, the balloon flying freely through the air, creating an air vortex, and being generally of a constant height, comprising means defining a column of air in direct communication with the air vortex, the inner end of the means defining such air column being an annular guard positioned about the spindle coaxial therewith and having at least one passage therein for the escape of air from the vortex, means for detecting the speed of escape of air through the passage, and means responsive to the last named means operative to vary the tension of the material in the balloon.

47. Apparatus for maintaining of substantially constant diameter the balloon of elongated flexible material at a spindle, the spindle having a balloon creating flyer and a guiding means spaced therefrom and located on the axis of the spindle, the balloon flying freely through the air, creating an air vortex, and being generally of a constant height, comprising means defining a column of air in direct communication with the air vortex, the inner end of the means defining such air column being an annular guard positioned about the spindle coaxial therewith, the guard generally conforming to the shape of the balloon and having at least one passage therein for the escape of air from the vortex, an air pressure detecting means connected to the passage, and means responsive to the last named means operative to vary the tension of the material in the balloon.

48. Apparatus for maintaining of substantially constant diameter the balloon of elongated flexible material at a spindle, the spindle having a balloon creating flyer and a guiding means spaced therefrom and located on the axis of the spindle, the balloon flying freely through the air, creating an air vortex, and being generally of a constant height, comprising means defining a column of air in direct communication with the air vortex, the inner end of the means defining such air column being an annular guard positioned about the spindle coaxial therewith, the guard generally conforming to the shape of the balloon and having at least one passage therein for the escape of air from the vortex, means for detecting the speed of escape of air through the passage, and means responsive to the last named means operative to vary the tension of the material in the balloon.

49. Apparatus for controlling the balloon of elongated flexible material at a spindle having a balloon forming flyer, comprising a guiding means for the free end of such balloon, means mounting the guiding means in alignment with the axis of the flyer, such last named means including means for adjusting the guiding means along such axis toward and away from the flyer, means for detecting changes in the diameter of the balloon, and means responsive to the last named means for governing the adjusting means for the guiding means.

50. Apparatus for maintaining of substantially constant diameter the balloon of an elongated flexible material twisting spindle, the balloon flying freely through the air and creating an air vortex, comprising means defining a column of air in direct communication with the vortex, the inner end of the means defining such air column being positioned at a predetermined distance from the axis of the spindle, an expansible chamber connected to the air column defining means, variable means for imposing retarding tension on the material at the entering end of the balloon, and means operated by the expansible chamber for varying the tension imposing means so that the tension imposed thereby varies in accordance with the pressure in the air column.

51. Apparatus for maintaining of substantially constant diameter the balloon of an elongated flexible material twisting spindle, the balloon flying freely through the air and creating an air vortex, comprising means defining a column of air in direct communication with the vortex, the inner end of the means defining such air column being positioned at a predetermined distance from the axis of the spindle, the outer end of the air column defining means being open to allow egress of the air in the column, an anemometer for detecting the speed of escape of the air from the column, variable means for imposing retarding tension on the material at the entering end of the balloon, and means operated by the anemometer for varying the tension imposing means so that the tension imposed thereby varies in accordance with the speed of escape of the air.

52. Apparatus comprising a shaft, means for rotating the shaft at a constant angular velocity, means on the shaft for supporting one end of a thin elongated object and for swinging the object in an orbit around the shaft, the object setting up an air vortex, means for detecting changes in the diameter of the orbit comprising means defining a column of air having its inner end at a fixed distance from the axis of rotation of the object and in direct communication with the air vortex, and means for measuring the speed of the air in such column.

53. Apparatus comprising a shaft, means for rotating the shaft at a constant angular velocity, means on the shaft for supporting one end of a thin elongated object and for swinging the object in an orbit around the shaft, the object setting up an air vortex, means for detecting changes in the diameter of the orbit comprising means defining a column of air having its inner end at a fixed distance from the axis of rotation of the object and in direct communication with the air vortex, and means for measuring the pressure of the air in such column.

54. A spindle for twisting elongated flexible material having substantially constant properties along the length thereof, said spindle having a flyer, means for rotating the flyer at constant speed, a balloon guiding means spaced from the flyer to define a balloon of generally constant height, and means for controlling the balloon to maintain it of substantially constant diameter, said last named means comprising means at the spindle for detecting changes in a phenomenon which is directly attendant upon the balloon and which changes to a substantial degree solely as a result of changes in balloon diameter, the changes in such phenomenon having a known predetermined relationship with the changes in the diameter of the balloon, and means operative in response to the last named means to vary the tension of the material in the balloon.

55. A spindle for twisting elongated flexible material having substantially constant properties along the length thereof, said spindle having a flyer, means for rotating the flyer at constant speed, a balloon guiding means spaced from the flyer to define a balloon of generally constant height, and means for controlling the balloon to maintain it of substantially constant diameter, said last named means comprising means at the spindle responsive substantially solely to changes in diameter of the balloon, and means operative in response to the last named means to vary the tension of the material in the balloon.

56. A spindle for twisting elongated flexible material having substantially constant properties along the length thereof, said spindle having a flyer, means for rotating the flyer at constant speed, a balloon guiding means spaced from the flyer to define a balloon of generally constant height, and means for controlling the balloon to maintain it of substantially constant diameter, said last named means comprising means at the spindle for detecting changes in a phenomenon which is directly attendant upon the balloon and which changes to a substantial degree solely as a result of changes in balloon diameter, the changes in such phenomenon having a known predetermined relationship with the changes in the diameter of the balloon, a first feeding means at the entering end of the balloon for feeding the material into the balloon, a second feeding means at the exit end of the balloon for withdrawing the material from the balloon, one of said last two means feeding the material at substantially constant speed and the other such means feeding the material at a variable speed, and means responsive to the means for detecting changes in such phenomenon to vary the speed of feeding of the variable speed feeding means.

57. An infeeding spindle for twisting elongated flexible material, said spindle having a flyer, means for rotating the flyer at constant speed, a balloon guiding means spaced from the flyer to define a balloon of generally constant height, the material passing in that order through the balloon guiding means, the balloon, and radially inwardly of the flyer, and means for controlling the balloon to maintain it of substantially constant diameter, said last named means comprising means at the spindle for detecting changes in a phenomenon which is directly attendant upon the balloon and which changes to a substantial degree solely as a result of changes in balloon diameter, the changes in such phenomenon having a known predetermined relationship with the changes in the diameter of the balloon, and means operative in response to the last named means to vary the tension of the material in the balloon.

58. A spindle for twisting elongated flexible material having substantially constant properties along the length thereof, said spindle having a flyer, means for rotating the flyer at constant speed, a balloon guiding means spaced from the flyer to define a balloon of generally constant height, and means for controlling the balloon to maintain it of substantially constant diameter, said last named means comprising means at the spindle for continuously measuring changes in a phenomenon which is directly attendant upon the balloon and which changes to a substantial degree solely as a result of changes in balloon diameter, the changes in such phenomenon having a known predetermined relationship with the changes in diameter of the balloon, and means comprising a feed roll engaging the material operative in response to said phenomenon measuring means to vary the tension of the material in the balloon.

59. A spindle for twisting elongated flexible material, said spindle having a flyer, means for rotating the flyer at constant speed, a balloon guiding means spaced from the flyer to define a balloon of generally constant height, and means for controlling the balloon to maintain it of substantially constant diameter, said last named means comprising means at the spindle for continuously measuring the diameter of the balloon of such material, and means operative in response to said balloon diameter measuring means to vary the tension of the material in the balloon.

60. A spindle for twisting elongated flexible material having substantially constant properties along the length thereof, said spindle having a flyer, means for rotating the flyer at constant speed, a balloon guiding means spaced from the flyer to define a balloon of generally constant height, and means for controlling the balloon to maintain it of substantially constant diameter, said last named means comprising means at the spindle for continuously measuring the diameter of the balloon of such material, and means operative in response to said balloon diameter measuring means to vary the tension of the material in the balloon.

61. In strand-twisting apparatus, in combination, means for rotating a strand in the form of a balloon, means for pulling the strand forward, a guiding means for the free end of the balloon spaced from the means for rotating the balloon, means mounting the guiding means in alignment with the axis of rotation of the last named means, the means mounting the guiding means including means for adjusting the guiding means along such axis toward and away from the balloon rotating means, means for detecting changes in the diameter of the balloon, and means responsive to the last named means for governing the adjusting means for the guiding means so that the guiding means is lowered when the diameter of the balloon increases and is raised when the diameter of the balloon decreases.

62. Apparatus for handling elongated flexible material advancing under tension through a zone in which it forms a rotating bulging free-flying loop, comprising means interacting with a portion of the loop intermediate its ends for detecting changes in the size of the loop, and means responsive to the last named means for varying the size of the loop.

63. Apparatus for handling elongated flexible material advancing under tension through a zone in which it forms a rotating balloon, comprising means for rotating the balloon, a balloon guiding means from the last named means and located on the axis of rotation of such means, the material passing into the balloon through the guiding means and out of the balloon radially inwardly of the means for rotating the balloon, and means for controlling the size of the balloon comprising means for detecting changes in a phenomenon which is directly attendant upon the balloon and which changes to a substantial degree solely as a result of changes in balloon diameter, the changes in such phenomenon having a known predetermined relationship with the changes in diameter of the balloon, and means controlled by the last named means for controlling the size of the balloon.

64. Apparatus for handling elongated flexible material advancing under tension through a zone in which it forms a rotating balloon, comprising means surrounding and cooperating with a zone of the balloon intermediate its ends for detecting changes in the size of the balloon, and means responsive to the last named means for varying the size of the balloon.

65. Apparatus for handling elongated flexible material advancing under tension through a zone in which it forms a rotating balloon, comprising means coaxial of the orbit of a zone of the balloon intermediate its ends and receiving a force generated by such zone of the balloon for detecting changes in the size of the balloon, and means responsive to the last named means for varying the size of the balloon.

References Cited in the file of this patent

UNITED STATES PATENTS

| | | |
|---|---|---|
| 2,550,136 | Clarkson | Apr. 24, 1951 |
| 2,586,123 | Truitt | Feb. 19, 1952 |
| 2,654,211 | Uhlig | Oct. 6, 1953 |

UNITED STATES PATENT OFFICE
CERTIFICATE OF CORRECTION

Patent No. 2,989,837                        June 27, 1961

Alfred W. Vibber

It is hereby certified that error appears in the above numbered patent requiring correction and that the said Letters Patent should read as corrected below.

Column 4, line 3, for "incusive" read -- inclusive --; column 15, line 74, for "collumns" read -- columns --; column 19, line 64, for "cooperative" read -- cooperating --; column 23, line 2, for "previously" read -- primarily --; line 20, for "ballon" read -- balloon --.

Signed and sealed this 14th day of November 1961.

(SEAL)
Attest:

ERNEST W. SWIDER
Attesting Officer

DAVID L. LADD
Commissioner of Patents